United States Patent
Poulton

(10) Patent No.: US 11,986,119 B2
(45) Date of Patent: *May 21, 2024

(54) COOKING, SOLDERING, AND/OR HEATING SYSTEMS, AND ASSOCIATED METHODS

(71) Applicant: MTP Technologies, LLC, Phoenix, AZ (US)

(72) Inventor: Michael T. Poulton, Phoenix, AZ (US)

(73) Assignee: MTP TECHNOLOGIES, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,167

(22) Filed: Jul. 26, 2022

(65) Prior Publication Data

US 2022/0369844 A1 Nov. 24, 2022

Related U.S. Application Data

(63) Continuation of application No. 17/397,791, filed on Aug. 9, 2021, now Pat. No. 11,426,022.

(Continued)

(51) Int. Cl.
  *G01K 7/00* (2006.01)
  *A23L 5/10* (2016.01)
  (Continued)

(52) U.S. Cl.
  CPC ............ *A47J 27/004* (2013.01); *A23L 5/12* (2016.08); *A23L 5/15* (2016.08); *A47J 36/321* (2018.08);
  (Continued)

(58) Field of Classification Search
  CPC ......... A47J 27/004; A47J 36/321; A23L 5/12; A23L 5/15; G01J 5/00; G01J 13/00;
  (Continued)

(56) References Cited

U.S. PATENT DOCUMENTS 5,771,786 A 6/1998 Chung
6,034,359 A 3/2000 Busch
(Continued)

FOREIGN PATENT DOCUMENTS

CA 3064170 A1 * 11/2018 ............... A23L 5/10
CN 1484508 A 3/2004
(Continued)

OTHER PUBLICATIONS

Blutinger, et al., "Precision cooking for printed foods via multiwavelength lasers", npj Science of Food, 5, Article No. 24 (2021).

(Continued)

*Primary Examiner* — Gail Kaplan Verbitsky
(74) *Attorney, Agent, or Firm* — Perkins Coie LLP

(57) ABSTRACT

Embodiments include systems and methods for heating materials, including heating materials for cooking and soldering. A representative system and method for cooking food includes passing electric current through the food, sensing a characteristic of the food, and modulating the electric current in response to the characteristic of the food to achieve a selected internal temperature of the food. The system and method can include searing the food with hot oil or photons directed at the surface of the food. A representative system and method for heating a material includes modulating a plurality of semiconductor light sources to emit photons toward the material, measuring a temperature of the material, and modulating the plurality of semiconductor light sources in response to the temperature of the material. The material can include solder and the method can include heating solder in a reflow soldering process.

18 Claims, 8 Drawing Sheets

Related U.S. Application Data

(60) Provisional application No. 63/066,092, filed on Aug. 14, 2020.

(51) Int. Cl.

| | | |
|---|---|---|
| *A47J 27/00* | (2006.01) | |
| *A47J 36/32* | (2006.01) | |
| *G01J 5/00* | (2022.01) | |
| *G01K 13/00* | (2021.01) | |
| *G01N 21/31* | (2006.01) | |
| *G05D 23/19* | (2006.01) | |
| *H05B 1/02* | (2006.01) | |
| *H05B 3/00* | (2006.01) | |
| *G01J 5/48* | (2022.01) | |

(52) U.S. Cl.
CPC ............. *G01J 5/00* (2013.01); *G01K 13/00* (2013.01); *G01N 21/31* (2013.01); *G05D 23/1917* (2013.01); *H05B 1/0261* (2013.01); *H05B 3/0004* (2013.01); *H05B 3/0076* (2013.01); *A23V 2002/00* (2013.01); *G01J 2005/0077* (2013.01); *G01J 5/485* (2022.01); *G01K 7/00* (2013.01); *G01K 2207/06* (2013.01)

(58) Field of Classification Search
CPC ...... G01J 2005/0077; G01J 2005/0085; G05D 23/1717; H05B 1/0261; H05B 3/0004; A23V 2002/00; G01K 2207/06
See application file for complete search history.

(56) References Cited

U.S. PATENT DOCUMENTS

| | | | |
|---|---|---|---|
| 6,784,405 | B2 | 8/2004 | Flugstad et al. |
| 9,510,605 | B2* | 12/2016 | Melnyczuk .............. A23L 19/18 |
| 11,242,998 | B2 | 2/2022 | Van Zutphen et al. |
| 11,426,022 | B2* | 8/2022 | Poulton .............. G05D 23/1917 |
| 2012/0104868 | A1 | 5/2012 | Baarman et al. |
| 2012/0128839 | A1* | 5/2012 | DaPuzzo .................. A23B 4/20 |
| | | | 426/240 |
| 2015/0164127 | A1* | 6/2015 | Long ................... A47J 36/2483 |
| | | | 99/342 |
| 2016/0350715 | A1 | 12/2016 | Minvielle |
| 2018/0153195 | A1* | 6/2018 | Rhodes, Jr. ............ B01D 17/12 |
| 2019/0261465 | A1 | 8/2019 | Meng et al. |
| 2019/0364952 | A1 | 12/2019 | Flick |
| 2019/0375575 | A1* | 12/2019 | Roulier .................. A23L 7/183 |

FOREIGN PATENT DOCUMENTS

| | | |
|---|---|---|
| CN | 208640489 U | 3/2019 |
| CN | 111084400 A | 5/2020 |
| CN | 112089331 A | 12/2020 |
| CN | 112535413 A | 3/2021 |
| DE | 102018119015 A1 | 2/2020 |
| DE | 102018119016 A1 | 2/2020 |
| JP | 2006263020 A | 10/2006 |
| JP | 4116850 B2 | 4/2008 |
| JP | 5386346 B2 | 10/2013 |
| JP | 6568295 B1 | 8/2019 |
| JP | 2020171517 A | 10/2020 |
| TW | 1566726 B | 1/2017 |
| TW | 1687171 B | 3/2020 |
| WO | 2017098027 A1 | 6/2017 |

OTHER PUBLICATIONS

De Alwis, et al., "The use of direct resistance heating in the food industry", Journal of Food Engineering, vol. 11, Issue 1, 1990, pp. 3-27.

Jaeger, et al., "Opinion on the use of ohmic heating for the treatment of foods", Trends in Food Science & Technology, vol. 55, Sep. 2016, pp. 84-97.

Prasad, "Applications of Light-Emitting Diodes (LEDs) in Food Processing and Water Treatment", Food Engineering Reviews, 12, 268-289 (2020).

USPTO/ISA, "International Search Report and Written Opinion", for Application No. PCT/US21/45275, dated Jan. 19, 2022.

USPTO/ISA, "Invitation to Pay Additional Fees", for Application No. PCT/US21/45275, dated Oct. 6, 2021.

Zell, et al., "Ohmic cooking of whole beef muscle—Evaluation of the impact of a novel rapid ohmic cooking method on product quality", Meat Science, vol. 86, Issue 2, Oct. 2010, pp. 258-263.

Zell, et al., "Ohmic cooking of whole beef muscle—Optimisation of meat preparation", Meat Science, vol. 81, Issue 4, Apr. 2009, pp. 693-698.

Zell, et al., "Ohmic cooking of whole turkey meat—Effect of rapid ohmic heating on selected product parameters", Food Chemistry, vol. 120, Issue 3, Jun. 1, 2010, pp. 724-729.

* cited by examiner

COOKING, SOLDERING, AND/OR HEATING SYSTEMS, AND ASSOCIATED METHODS

CROSS-REFERENCE TO RELATED APPLICATIONS

The present application is a continuation of U.S. patent application Ser. No. 17/397,791, filed Aug. 9, 2021, which claims priority to U.S. Provisional Patent Application No. 63/066,092, filed Aug. 14, 2020, each of which is incorporated herein by reference in its entirety.

TECHNICAL FIELD

The present disclosure is directed generally to systems and methods for heating materials, including activities related to cooking, curing, and/or soldering. Representative aspects of the present disclosure relate to heating materials using bulk photon sources, hot oil, and/or electrical conduction.

BACKGROUND

Conventional systems and methods of cooking meat include grilling, frying, baking, roasting, braising, broiling, and/or other systems and methods, which traditionally involve heating the meat with fire or a blackbody heating element, such as a stovetop element or electric oven element. Cooking meat using such conventional systems and methods requires the cook to monitor the temperature, appearance, and/or other aspects of the meat in order to stop the cooking process at the correct time to ensure the meat is neither undercooked nor overcooked.

Some conventional cooking techniques stop cooking by removing the food from the cooking vessel. For example, the process of blanching vegetables is typically stopped by removing the food from the hot water and plunging it into an ice bath. Meats are typically removed from the cooking area to terminate the cooking process. In some conventional systems, blackbody radiation sources and surrounding equipment store heat that continues to cook the meat even after the system is turned off. Rapidly adjusting the cooking temperature in many existing systems is not possible because of the thermal mass of their components. Accordingly, one challenge associated with conventional cooking systems and methods is a lack of precision in cooking the meat to a precise "doneness" without removing the food from proximity to the cooking equipment. Conventional cooking systems and methods can also involve a relatively long cooking time in part because externally-applied heat must penetrate the full thickness of the food.

Microwave ovens and ohmic cooking can sometimes provide shorter cooking time, and they can facilitate instantly terminating the cooking process. However, these processes do not produce a browned or seared exterior surface, which is necessary or highly desirable for many foods. Furthermore, microwaves absorb primarily in the outer layer of water-laden foods, with poor penetration and uneven spatial distribution of energy input throughout the bulk of the food. Accordingly, another challenge with conventional cooking systems is an inability to quickly cook food to an even degree.

Conventional systems and methods for assembling printed circuit boards (PCBs) include reflow soldering systems and methods. In conventional reflow soldering, the pads of the PCB are coated with solder paste (a mixture of solder material and flux). Components are positioned on the PCB such that their terminals are positioned on the pads of the PCB. The assembly is heated in an oven to melt the solder, which flows between the terminals and the pads. When the solder cools, the components become fixed to the PCB. During this process, it is important to control the rate of heating of the PCB. For example, the rate of heating must be fast enough to avoid prolonged exposure of the components to excessive heat, but slow enough to avoid thermal shock damage to the components and to allow for sufficient drying of the components and activation of the flux.

Accordingly, a disadvantage of conventional reflow soldering is that an entire assembly of components must be heated to melt the solder, which risks damage to sensitive components and requires precision control of the heat applied to the assembly (e.g., by moving the assembly through zones of different temperature or by varying the oven temperature). However, such precision control is difficult with conventional methods, which can include infrared radiant heating, air convection, and steam injection, each of which involves blackbody radiation from heating elements and hot oven components, and which presents uniformity problems due to portions of the assembly having different thermal capacities. Overcoming these difficulties and problems using conventional reflow soldering techniques is cumbersome.

Aspects of the present technology are directed to addressing these and other challenges.

BRIEF DESCRIPTION OF THE DRAWINGS

In the drawings, wherein the same reference number indicates the same element throughout the views.

DETAILED DESCRIPTION

Figure 1:
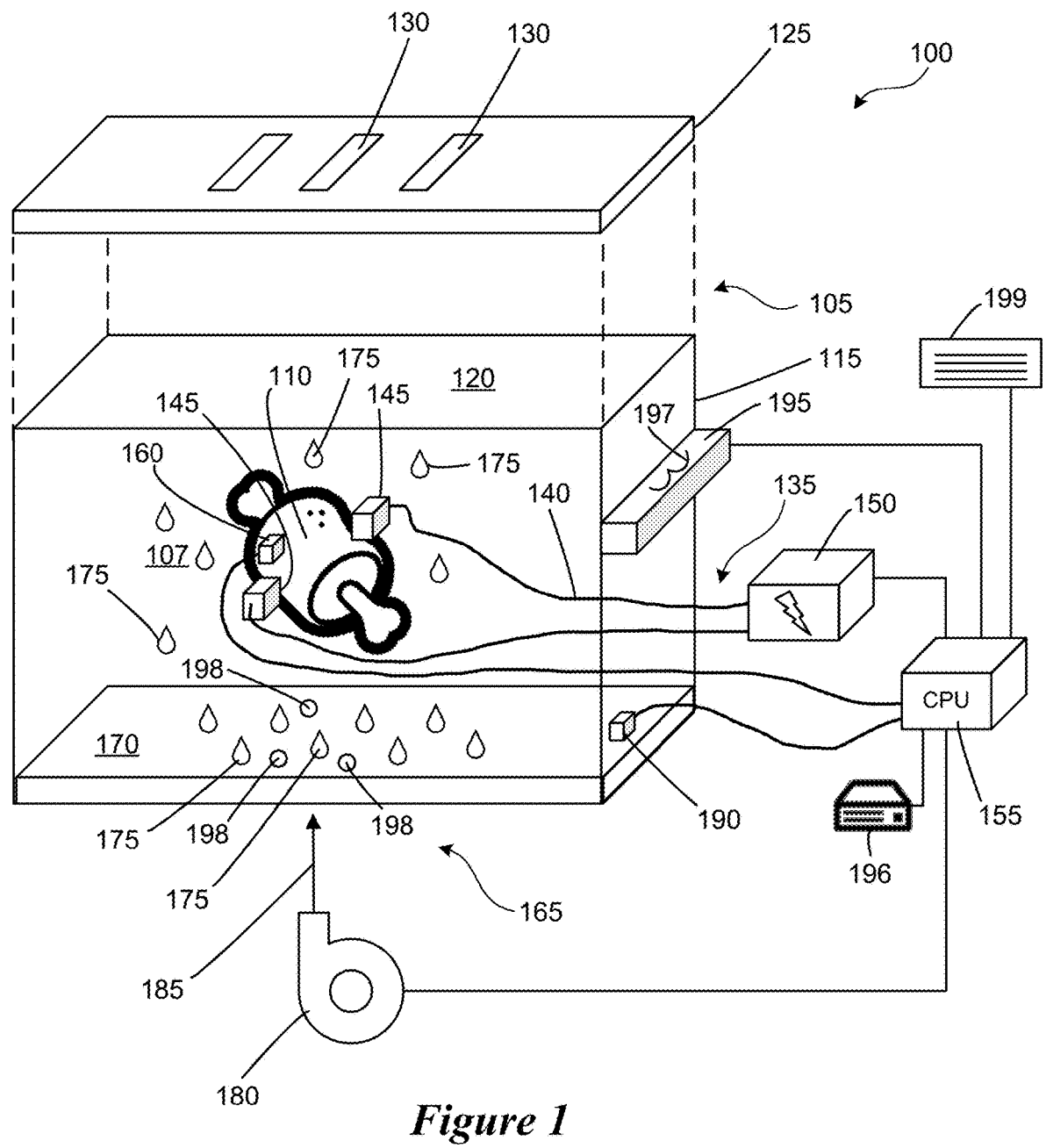
FIG. 1 illustrates a partially schematic isometric view of a system for cooking food, configured in accordance with embodiments of the present technology.

Several embodiments of the technology disclosed herein are directed to systems and methods for heating materials, including activities related to cooking, curing, soldering (such as reflow soldering), and/or other activities related to heating materials.

For example, systems and methods for cooking configured in accordance with embodiments of the present technology can include cooking with electrical conduction (using the impedance and/or resistance of the food), cooking using hot oil distributed onto the food (e.g., via splashing or otherwise agitating using hot air), and/or cooking using bulk photon sources, such as lasers or light-emitting diodes (LEDs). Cooking using hot oil and/or bulk photon sources can include broiling or surface-searing the food.

Systems and methods for heating materials in accordance with embodiments of the present technology can generally include heating the materials using bulk photon sources, which can include semiconductor light sources such as light-emitting diodes and/or laser diodes. Heating materials can include curing a material, activating a heat-activatable material, and/or performing soldering, such as reflow soldering. Although embodiments of the present technology include cooking, curing, and soldering, these applications are only some examples of applications of embodiments of the present technology. Accordingly, embodiments of the present technology include various systems in which modifying the characteristics of a substance or a surface using heat or light is desired.

Various embodiments include controllers programmed with instructions that, when executed, carry out closed-loop control to modulate the heating according to particular applications. In some embodiments, the bulk photon sources are selected such that their output wavelengths match the absorption spectrum of the material to be heated. In some embodiments, the bulk photon sources are selectively controlled so that a material is exposed to wavelengths of light that correspond to the absorption spectrum of the material to be heated. In some embodiments, the material is modified to include a material that has an absorption spectrum corresponding to the output wavelength(s)/spectrum of the bulk photon sources. Other embodiments, features, advantages, and applications will appear hereinafter.

The following description provides specific details for a thorough understanding and an enabling description of various embodiments. One skilled in the art will understand, however, that the systems and methods can be practiced without many of these details and/or with alternative approaches. Several details describing structures and processes that are well-known and often associated with certain components, such as semiconductor light sources (including laser diodes and LEDs), power supplies, sensors, thermal cameras, non-contact infrared temperature sensors, and controllers, are not set forth in the following description to avoid obscuring other aspects of the disclosure. Moreover, although the following disclosure sets forth several embodiments, several other embodiments can have different configurations, arrangements, and/or components than those described in this section. In particular, other embodiments can have additional elements, and/or can lack one or more of the elements described below with reference to FIGS. 1-9. The features described herein can be used separately or together, or in various combinations of one or more of them.

A. SYSTEMS AND METHODS FOR COOKING

Embodiments of the present technology cook food (such as meat) in one or more of several different manners, such as: (a) electrical conduction cooking (which may alternatively be referred to as resistance cooking or impedance cooking); (b) hot oil searing (spraying the food with oil agitated by hot air); (c) searing with one or more bulk photon sources; (d) searing with hot air; and/or (e) induction heating.

Electrical Conduction Cooking, Hot Oil Searing, and Induction Heating

Embodiments of the present technology include systems that apply current to food in an electrical circuit. The impedance and/or resistance of the food converts the current passing through the food to heat. In some embodiments, the food is cooked to a precise degree by adding a specific amount of total energy to the food in a specific amount of time. Further aspects of the present technology cook the exterior surface of the food (i.e., sear the food) using hot oil.

FIG. 1 illustrates a partially schematic isometric view of a system 100 for cooking food, configured in accordance with embodiments of the present technology. In some embodiments, the system 100 can include an enclosure 105 for containing food 110 (such as meat). The enclosure 105 can have several forms suitable for forming a chamber or cooking zone 107 for containing the food 110 before, during, and/or after cooking the food 110. For example, in some embodiments, the enclosure 105 can include a box 115 that has an opening 120 on top for a user to position the food 110 within the box 115, and a cover 125 for covering the opening 120. The cover 125 is shown in FIG. 1 as being lifted off of the box 115, but it is readily understood that the cover 125 can be placed on the box 115 over the opening 120. In some embodiments, the cover 125 can include one or more vents 130 for releasing pressure, gases, and/or excess heat from a cooking process performed using the system 100. Although the enclosure 105 is described and illustrated as a box 115 with a top cover 125, enclosures 105 configured in accordance with embodiments of the present technology are not limited to the illustrated form. Rather, in some embodiments, an enclosure 105 may include a pivoting top cover or lid, a side door, and/or the enclosure 105 can have forms other than a box, such as a prolate ellipsoid with a clamshell opening mechanism. The enclosure 105 need not be fully enclosed (it can have one or more openings). Generally, the enclosure 105 includes any enclosure suitable for containing the food 110 and/or for supporting one or more of the components of the system 100. The enclosure 105 may be formed with metal, as a metal frame supporting nonmetal components, and/or with other suitable materials. In some embodiments, the system 100 is in the form of a commercial, residential, or industrial kitchen appliance, such as a single appliance that performs one or more aspects of the present technology.

In some embodiments, the system 100 includes components for cooking the interior of the food 110. For example, the system 100 can include an electrical conduction cooking system 135 for carrying out an electrical conduction cooking method. The electrical conduction cooking system 135 can include one or more electrical circuits 140, each electrical circuit 140 including two or more electrodes 145 for electrically connecting the food 110 into the electrical circuit 140. The electrodes 145 can be penetrated into the food 110, pressed against the food 110, or otherwise in contact with the food 110 (directly or indirectly). Each electrical circuit 140 also includes a power supply 150 connected to the electrodes 145 via the electrical circuit 140 for providing electric current to the electrodes 145. In some embodiments with multiple circuits 140, the circuits 140 can share a single power supply 150 or multiple power supplies 150 configured to modulate each circuit 140 independently or concurrently. The quantity of electrodes 145, circuits 140, and/or power supplies 150 may depend in part on the size of the food 110. In some embodiments, multiple electrical circuits 140 are beneficial for larger pieces of food 110 and/or pieces of food 110 with uneven thicknesses. However, smaller pieces of food 110 and/or uniformly thick pieces of food 110 (such as single-serving steaks) can be prepared using a single electrical circuit 140 and two electrodes 145.

Although FIG. 1 illustrates the electrodes 145 directly connected to the power supply 150, in some embodiments, one or more of the electrodes 145 can include any suitable direct or indirect electrical connection to the power supply 150 (e.g., the circuit 140 can include a portion of the enclosure 105 or another component of the system 100). Accordingly, the electrodes 145 can include any element or elements that electrically connect the food 110 to the power supply 150 to form a circuit 140.

In some embodiments, the electrodes 145 can include electrical contact grids (see FIG. 2B, which is described below). The contact surfaces of the electrodes 145 (i.e., the surfaces of the electrodes 145 that contact the food 110) can include stainless steel, nickel-containing alloys, titanium, cobalt-containing alloys, vanadium-containing alloys, and/or other corrosion resistant metal alloys which resist electrolytic degradation in a wet, salty environment associated with cooking food. The electrodes 145 can include a coating and/or they can be chemically treated to improve corrosion resistance (e.g., they can be passivated). Suitable coatings can include dielectric materials such as fluoropolymer, alumina, glass-ceramic, and/or other dielectric material suitable for the temperature and environment. In some embodiments, the electrode 145 contact surface can be made from rhodium, platinum, iridium, ruthenium, palladium, gold, alloys of these metals, and/or other suitable materials, to resist electrolytic degradation. The contact surfaces can be plated, bonded in layers, and/or otherwise applied to a substrate, and/or the electrode may be solid/uniform, or can have other configurations suitable for providing electric current to the food 110. In some embodiments, the electrodes 145 can be formed with non-metallic conductive materials that are corrosion-resistant, such as graphite or conductive diamond material. Corrosion-resistance may be especially beneficial in electrical conduction cooking systems 135 that use direct current (e.g., to resist ion migration into the food 110).

The power supply 150 can include a switching power supply capable of producing variable output impedance during the cooking process to provide constant power to the food 110 while the characteristics of the food 110 change during the cooking process. For example, in some embodiments, the output impedance of the power supply can vary during the cooking process in response to changing impedance of the food 110 during the cooking process. In some embodiments, the power supply 150 produces alternating current with a frequency high enough to minimize migration of metal ions from the electrodes 145 into the food 110, such as an alternating current at a frequency of ten cycles per second or higher, and/or varying other characteristics of current. In some embodiments, such as embodiments that include coatings of one or more dielectric materials on the electrodes 145, the frequency of the power supply 150 may be high enough to transfer cooking current through the food 110 capacitively without direct ohmic contact, such as 1 MHz, or other suitable frequencies, via electrodes 145 insulated from the meat by the dielectric material. In such embodiments, the bulk resistivity of the food 110 and its geometry, together with the frequency of the power supply 150, may prevent the high-frequency skin effect from causing uneven heating of the meat by ensuring that the skin depth is large in comparison to the dimensions of the food 110. Some embodiments can include capacitive current transfer, and the electrode 145 may form part of a resonant circuit in conjunction with power supply 150.

In operation, the electrical conduction cooking system 135 inputs electrical energy to the food 110 by passing an electric current through the food 110. The current can include direct current and/or alternating current. The resistance of the food 110 converts the electrical energy (e.g., the product of the current passing through the food 110 and the voltage drop across it) into thermal energy (heat), which cooks the interior of the food 110. In some embodiments, the electrical conduction cooking system 135 includes a controller 155 that is programmed with instructions that, when executed, perform closed-loop or other control to modulate the output of the power supply 150 during the cooking process in order to regulate the cooking temperature and cooking time of the food 110. For example, the controller 155 can cause the electrical conduction cooking system 135 to input electrical energy to the food 110 to bring it to temperature and hold it at that temperature for an amount of time, depending on the type of food, the desired doneness, and the desired speed of cooking.

To provide feedback to the controller 155 regarding the food 110, the power supply 150 can output information about its status to the controller 155 (e.g., parameters associated with its power, current, voltage, and/or resistance or impedance in the circuit 140). The electrical conduction cooking system 135 can include a sensor 160 connected to the controller 155. The sensor 160 can include a temperature sensor in the form of a probe pressed into the food 110 for sensing an internal temperature of the food 110. Suitable temperature sensors include a thermometer, resistance temperature detector, thermistor, thermocouple, and/or another device suitable for sensing temperature.

In addition to the electrical conduction cooking system 135, or as an alternative to the electrical conduction cooking system 135, the system 100 can include a searing system for cooking (e.g., searing) the exterior surface of the food 110. For example, the system 100 can include a hot oil cooking system 165 for cooking (e.g., searing) the exterior surface of the food 110. The hot oil cooking system 165 operates by spraying, splashing, or otherwise distributing hot oil onto the food 110, and/or by submerging the food 110 in hot oil.

The hot oil cooking system 165 can include an oil reservoir 170 for containing cooking oil 175. The reservoir 170 is positioned beneath the food 110 (e.g., beneath the cooking zone 107) and the oil 175 is sprayed, splashed, or otherwise distributed on the food 110 by being agitated from the reservoir 170 upward onto the food 110. For example, the hot oil cooking system 165 can include a hot air source 180 positioned to blow hot air 185 into the enclosure 105 through the oil reservoir 170 and into the oil 175. The hot air source 180 can blow hot air 185 through one or more air passageways 198 in the oil reservoir 170 to form jets or blasts of hot air 185 that agitate the oil 175 to distribute (e.g., spray, splash, and/or flow) the oil 175 throughout the cooking zone 107 in the enclosure 105 and onto the food 110. The hot oil 175 impinges upon the surface of the food 110 and cooks (e.g., sears) the surface of the food 110, before dripping down for being distributed around the enclosure 105 again. In other embodiments, the hot oil 175 can be distributed around the cooking zone 107 and onto the food 110 in other suitable manners. In some embodiments, the reservoir 170 is large enough to submerge the food 110 in the oil 175.

In some embodiments, the hot oil cooking system 165 includes a controller, such as the controller 155. The controller 155 can control operation of the hot air source 180 by regulating the temperature of the hot air 185 and/or the flow rate of the hot air 185 in response to input from a temperature sensor 190 (which can be similar to the sensor 160 described above in connection with the electrical conduction cooking system 135). The temperature sensor 190 can be positioned anywhere in the cooking zone 107 that is sufficient to sense a temperature within the cooking zone 107. In some embodiments, the temperature sensor 190 is positioned in the oil 175 in the oil reservoir 170 to sense the temperature of the oil 175 (which may be more indicative of the amount of heat being applied to the food 110 than the air outside of the oil 175). In some embodiments, oil is omitted, and the hot oil cooking system 165 may simply be a hot air cooking system using the hot air 185. In further embodiments, the hot air source 180 can be an ambient temperature air source that blows ambient air into the hot oil 175 to distribute the hot oil 175 throughout the cooking zone 107.

In some embodiments, the system 100 can further include an enclosure heating system 195. The enclosure heating system 195 can include induction heating elements and/or resistance heating elements for heating the enclosure 195, the oil reservoir 170, and/or the oil 175. The enclosure heating system 195 can also keep the food 110 warm after cooking, and/or it can otherwise add heat to the system 100 for assisting with cooking the food 110. If the enclosure heating system 195 is an induction heating system, it can include a powered induction coil 197 that is coupled to the enclosure 105 to inductively heat the enclosure 105. The induction coil 197 is shown schematically in FIG. 1, but it is understood that it can be wrapped around the enclosure 105. The enclosure heating system 195 can include a controller, such as the controller 155, for operating the enclosure heating system 195. In some embodiments, the enclosure heating system 195 heats the oil 175 and/or the interior of the enclosure 105 to between 350 and 520 degrees Fahrenheit (such as 400 degrees Fahrenheit), or to other temperatures suitable for searing the food 110 with the oil 175. Generally, meat may be seared using oil at temperatures in excess of 350 degrees Fahrenheit. In some embodiments, the enclosure heating system 195 can include semiconductor light sources directed at the enclosure 105, and the enclosure 105 can include a material that absorbs the wavelength of the light from the semiconductor light sources, so that the enclosure 105 is heated by the semiconductor light sources. Aspects of semiconductor light sources for heating materials are described in further detail below.

The system 100 can optionally include a user interface 199 connected to the controller 155 for providing operating instructions to the controller 155, such as instructions to operate one or more of the components or subsystems of the overall system 100 (e.g., the electrical conduction cooking system 135, the hot oil cooking system 165, and/or the enclosure heating system 195). The user interface 199 can include a display, a keypad, a touch screen, a port for connecting to another computing device or to another system, a speaker, and/or other suitable interface elements for receiving user input to the system 100 and/or for reporting output to a user of the system 100. Other input can include a desired level of doneness, which instructs the controller 155 to adjust the time and temperature of operation for the subsystems 135, 165, and/or 195. The operating parameters of the system 100 for achieving a desired level of doneness and/or heating (e.g., time, temperature, etc.) can be stored in a memory 196 associated with and/or connected to the controller 155, and/or the controller 155 can automatically determine suitable operating parameters based on information from one or more sensors, as described in further detail below. Output from the user interface 199 can include an indication (e.g., visual and/or audible) of heating (cooking) progress, user input, and/or a temperature of the material (e.g., food). The user interface 199 and/or the controller 155 need not be digital devices. For example, the controller 155 and/or the user interface 199 can include analog elements, mechanical elements, electromechanical elements, or other such devices, including switches, variable resistors, or other manual control elements suitable for turning modulating elements (e.g., turning on, turning off, and/or adjusting the elements) of the systems and components disclosed herein.

Figure 2A:
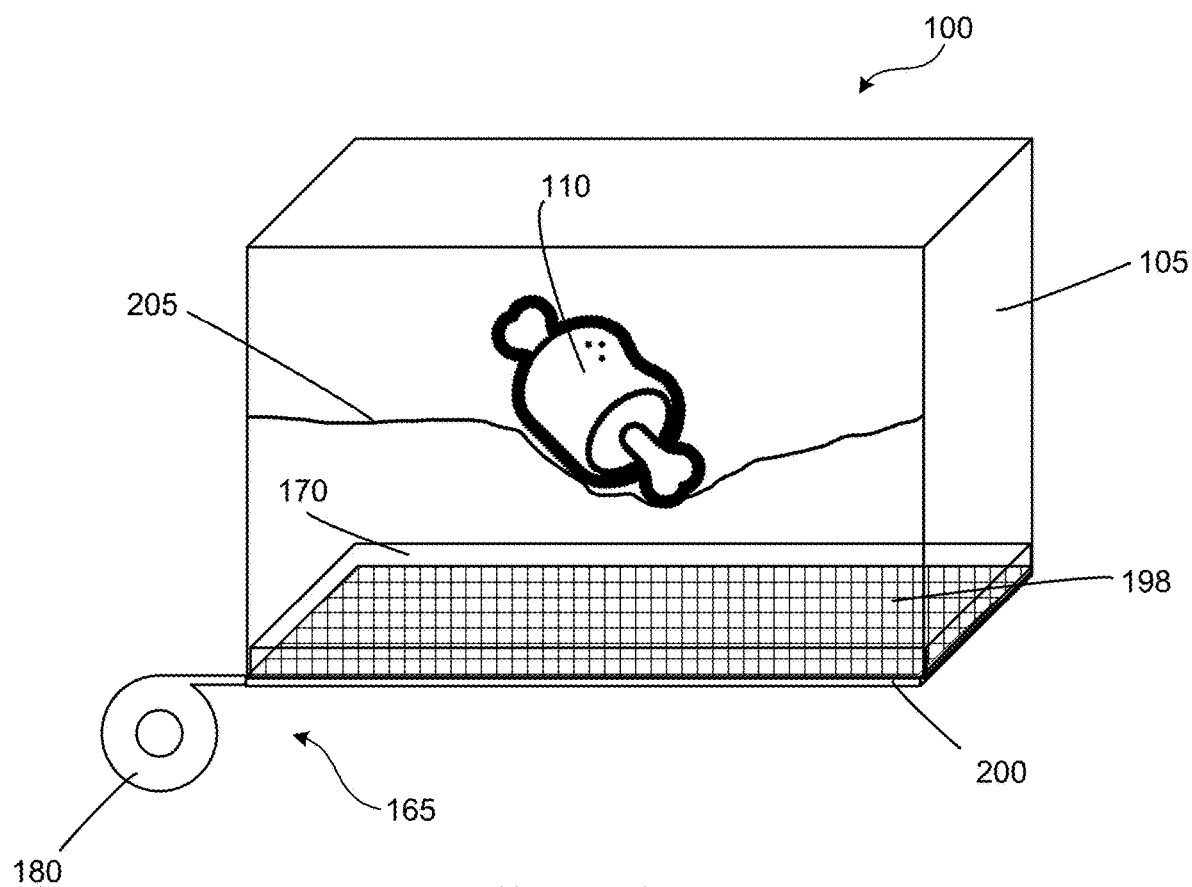
FIG. 2A illustrates a partially schematic isometric view of portions of the system shown in FIG. 1.

FIG. 2A illustrates a partially schematic isometric view of portions of the system 100 shown in FIG. 1. In some embodiments, the hot oil cooking system 165 includes a hot air input structure 200 positioned below or within the oil reservoir 170. The hot air input structure 200 includes the plurality of air passageways 198 (represented schematically as openings in a grid in FIG. 2A). The hot air source 180 forces hot air 185 into the hot air input structure 200 and through the air passageways 198, which are connected to the oil reservoir 170. The air passageways 198 may form hot air jets. The hot air 185 agitates the oil 175 in the oil reservoir 170 to distribute it around the interior of the enclosure 105. In some embodiments, one-way valves or traps are positioned on or in the air passageways 198 to resist or prevent the oil 175 from entering the hot air input structure 200. Further embodiments can include other systems or methods for agitating the oil 175 to distribute it around the enclosure 105.

FIG. 2A also shows a schematic illustration of a suspension mechanism 205 for supporting the food 110 above the oil reservoir 170. In some embodiments, the suspension mechanism 205 can include a spring-loaded rack that supports one or more of the electrodes 145 (see FIG. 1) and/or the sensor 160 (see FIG. 1). The suspension mechanism 205 can hold the food 110 about two inches above the oil reservoir 170, or other suitable distances, or it can hold the food 110 when it is submerged in the hot oil 175. In some embodiments, the food 110 can be positioned directly on the hot air input structure 200, which may include the oil reservoir 170. In some embodiments, the hot oil cooking system 165 can include a block of metal that has passageways for air and oil to travel through under pressure, and the block itself can be heated (for example heated with the enclosure heating system 195).

Figure 2B:
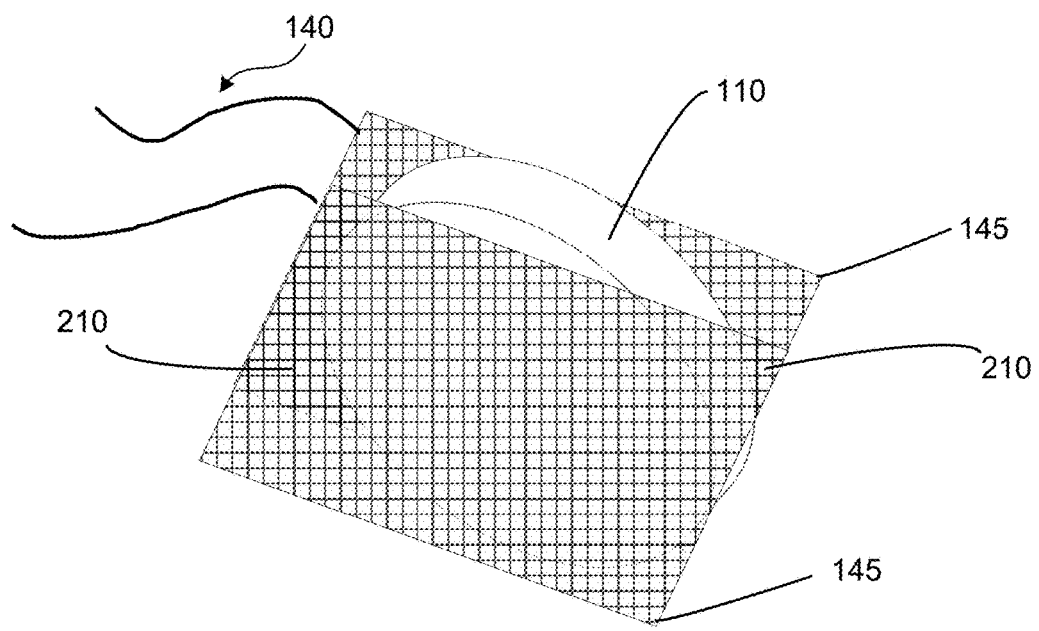
FIG. 2B illustrates a partially schematic view of electrodes for a system for cooking food, configured in accordance with embodiments of the present technology.
Figure 3:
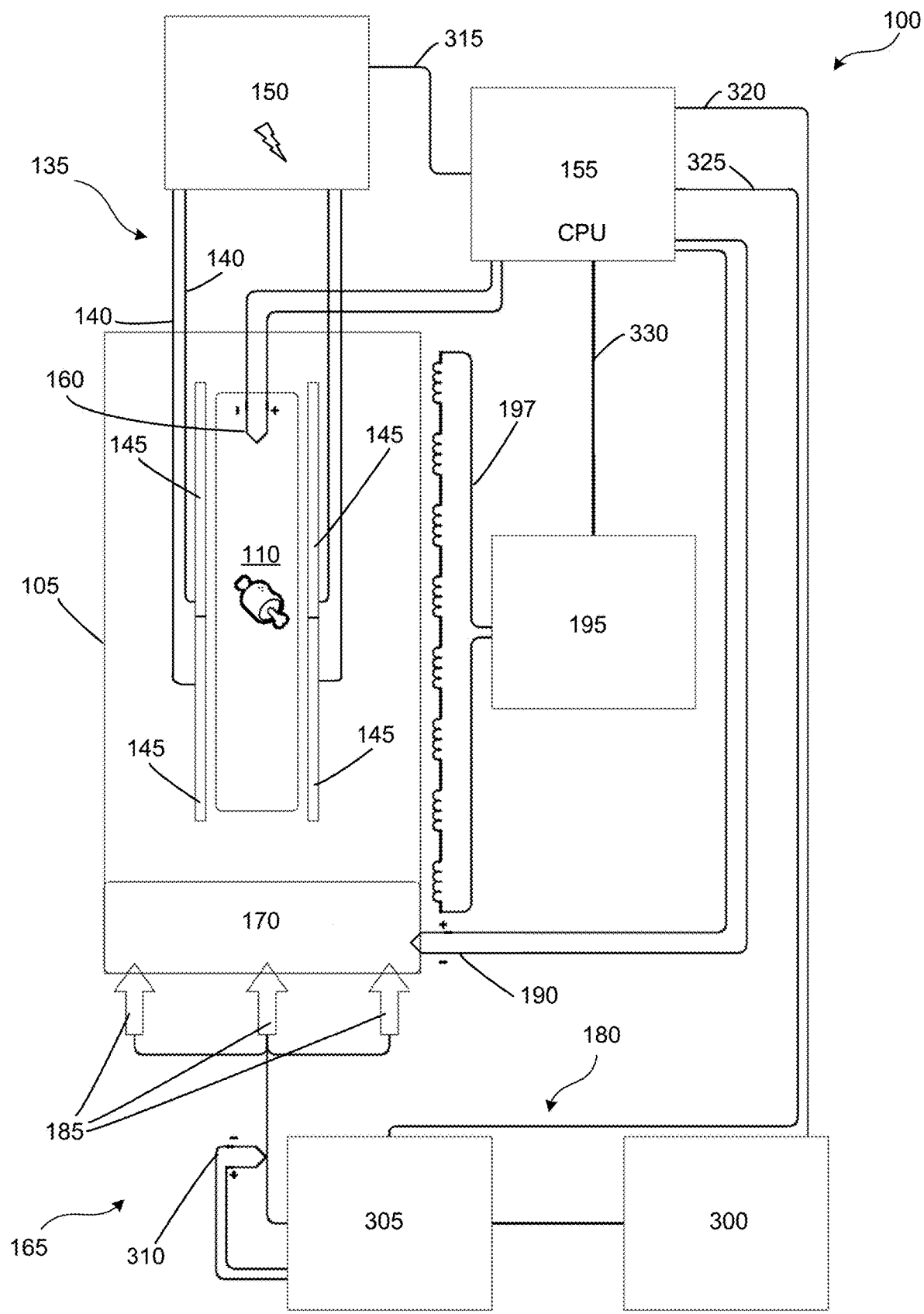
FIG. 3 illustrates a block diagram of the system shown in FIGS. 1 and 2A.

FIG. 2B illustrates a partially schematic view of the electrodes 145, configured in accordance with some embodiments of the present technology. In some embodiments, the electrodes 145 can include plates that generally coextend with the food 110 to facilitate broad diffusion and spread of the current. The electrodes 145 can be positioned on opposing sides of the food 110. In embodiments that implement multiple electrodes 145, the electrodes 145 can collectively coextend with a surface of the food 110 (e.g., as schematically illustrated in FIG. 3, described below). In some embodiments, the electrodes 145 can include a pattern of openings 210 forming a grid (e.g., to facilitate access by the hot oil and/or by light waves from a photon cooking system described below). In some embodiments, the electrodes 145 do not include openings 210. In some embodiments, the electrodes 145 need not coextend with the food 110, although in such embodiments more electrodes 145 may be helpful to improve evenness of cooking. Generally, the electrodes 145 can include any elements suitable for facilitating current flow into the food 110.

FIG. 3 illustrates a block diagram of the system 100 shown in FIGS. 1 and 2A, showing additional details of several components of the system 100. The power supply 150 can produce any level of power and/or current sufficient for cooking the food 110. In some embodiments, the power supply 150 can include a high-frequency alternating current (AC) power supply, or another suitable power supply.

For example, in some embodiments, the power supply 150 is configured to provide variable regulated constant-current or constant-power output to the electrodes 145. The power supply 150 can include constant-power regulation to vary its output, such as by governing the power supply 150 to maintain a setpoint of the output or input voltage-current product, with or without regard to the phase relationship between these parameters. The power supply 150 can include quasi-constant power regulation, which can include a regulated constant-current output with its current setpoint varied based on the load voltage. Alternatively, quasi-constant power regulation can include a regulated constant-voltage output with its voltage setpoint varied based on input or output current, or it can include other schemes of combined voltage-current regulation to achieve leveling of output power despite changing load impedance (which results from changing characteristics of the food 110 as it cooks).

Some embodiments regulate the energy throughput of the power supply 150 by governing the input power or current of the power supply 150, such as by regulating to maintain a setpoint for input line current. Other embodiments may use a power supply 150 with a constant-current output, thus reducing energy delivery as load impedance falls. Some embodiments may use combinations of various regulation regimes for the power supply 150, such as regulating to maintain the lesser of both an output power setpoint and an input line current setpoint, or other combinations of parameters in multiple regulation loops governing the power supply 150. The use of constant-power, quasi-constant-power, or constant-current regulation regimes for the power supply 150 to respond to changing load impedance facilitates more even heating relative to simply applying unregulated current to the food 110.

Generally, the controller 155 can modulate the output of the power supply 150 to achieve a relatively uniform rate of heating of the food 110. An advantage of using a power supply 150 that delivers a constant power level is that such a constant-power power supply 150 accommodates the variable impedance of the food 110 during the cooking process, such that less active modulation may be necessary from the controller 155 to maintain a generally consistent rate of heating. In some embodiments, the power supply 150 can output between 30 and 200 volts at 10 to 50 amps, although the specific voltage and current values will depend on the impedance of the food 110 itself, and can change during the cooking process as the characteristics of the food 110 change due to cooking. In some embodiments, the frequency output of the power supply 150 can be high enough to ensure minimal electrolytic corrosion of the electrode-to-food contact interface, such as 60 hertz, frequencies from 20 kilohertz to 250 kilohertz, or higher frequencies. In other embodiments, the power supply 150 can output other suitable frequencies of alternating current. In some embodiments, the controller 155 can modulate the power supply 150 to input a specific total amount of energy to the food 110 before stopping the electrical cooking process. For example, in some embodiments, a target maximum power level applied to a typical steak may be one to four kilowatts, and the total energy delivery can be between 60 and 90 kilojoules per pound of meat, or other suitable values.

FIG. 3 also illustrates that the electrical conduction cooking system 135 can include multiple electrical circuits 140. The electrical conduction cooking system 135 can include two, three, four, or more electrical circuits 140, each with two electrodes 145 for connecting the power source(s) 150 to the food 110. In some embodiments, some of the electrodes 145 can be common electrodes shared by multiple circuits 140. In some embodiments, the power supply 150 provides each circuit 140 with similar power levels (such as the same or generally the same power levels), which can make the rate of temperature rise in each portion of the food 110 generally equal. The use of constant-current power supplies or a combination of constant-power and constant-current control further assists in this process, by automatically reducing energy deposition into the hotter parts of the food 110 (because impedance decreases during cooking) and partially compensating for varying thicknesses of the food 110. Multiple circuits 140 and corresponding electrodes 145 (such as a pair of electrodes 145 for each circuit 140) can improve evenness of cooking relative to using only one circuit 140 and one pair of electrodes 145.

In some embodiments, the electrical circuits 140 and electrodes 145 are controllable independently of other electrical circuits 140 and electrodes 145 in contact with the food 110. Such independent control can enable targeted cooking of zones of the food 110 and independent control of each zone of the food 110. In such embodiments, systems can further include additional sensors 160 in or on the food 110, for example, one for each electrical circuit 140 or one for a subset of the electrical circuits 140. Cooking processes according to the present technology can be made relatively uniform by determining the specific heat capacity of the food 110 and programming the system 100 to add energy to the food 110 corresponding to the heat capacity and the desired final target internal temperature.

In some embodiments, the hot air source 180 of the hot oil cooking system 165 can include an air pump 300, which can include a diaphragm pump, a compressor, an impeller, and/or another source of blown and/or pressurized air. The air pump 300 can flow several cubic feet per minute at a pressure of a few pounds per square inch, although embodiments of the present technology can include air pumps 300 with any suitable capabilities for distributing the oil in the cooking zone. The hot air source 180 can also include a heater 305 that receives and heats air from the air pump 300. The heater 305 can include a process flow heater with a controller (such as a PID controller) that receives signals output from the controller 155 to modulate the temperature output of the hot air source 180. The hot air source 180 can include a temperature sensor 310 for sensing the temperature output by the hot air source 180 and for providing feedback to the heater 305 to regulate the temperature of the hot air 185 in a closed-loop process. In some embodiments, the heater 305 creates hot air 185 having a temperature between 400 degrees Fahrenheit and 700 degrees Fahrenheit, or other temperature ranges or values. In some embodiments, the temperature of the hot air 185 can be lowered to ambient or to a desired final cooking temperature of the food to stop the cooking process.

The controller 155 is connected to several of the components and subsystems of the system 100. The controller 155 can be programmed with instructions that, when executed, perform closed-loop control of the components and subsystems of the system 100 to regulate the cooking temperature and/or time of cooking of the food 110. For example, the sensor 160 can provide temperature information about the food 110. The controller 155 can receive a signal from the sensor 160 indicative of the temperature of the food 110 and, in response to the signal, output a conductive cooking power modulation signal 315 to control the power output of the power supply 150 to control the rate of cooking of the food 110. Likewise, the temperature sensor 190 can provide temperature information about the enclosure 105 and/or the oil 175. The controller 155 can receive a signal from the temperature sensor 190 indicative of the temperature of the oil 175 and/or the air inside the enclosure 105, and, in response to the signal, output a hot air agitation control signal 320 to control the speed of the hot oil cooking system 165, a hot air temperature setpoint control signal 325 to control the temperature output of the heater 305, and/or a cooking chamber heating modulation signal 330 to control the temperature of the enclosure 105 and/or the reservoir 170. Closed-loop control mechanisms can include hysteretic control, proportional-integral-derivative control, proportional-integral control, proportional-derivative control, on/off control, or other control mechanisms suitable for the controller 155 to receive temperature information about the food 110 and/or the enclosure 105 and adjust the subsystems to result in a selected heating rate, rate of energy delivery, and/or final temperature.

In further embodiments, the controller 155 can output a conductive cooking power modulation signal 315 based on the food surface temperature, the food electrical impedance, the food dielectric constant, and/or the food dielectric loss during the cooking process. The sensor 160 can be configured to sense one or more of those characteristics, and/or the sensor 160 can include multiple sensors for providing those characteristics to the controller 155. The power supply 150 can include circuitry for sensing one or more of these characteristics.

Figure 4:
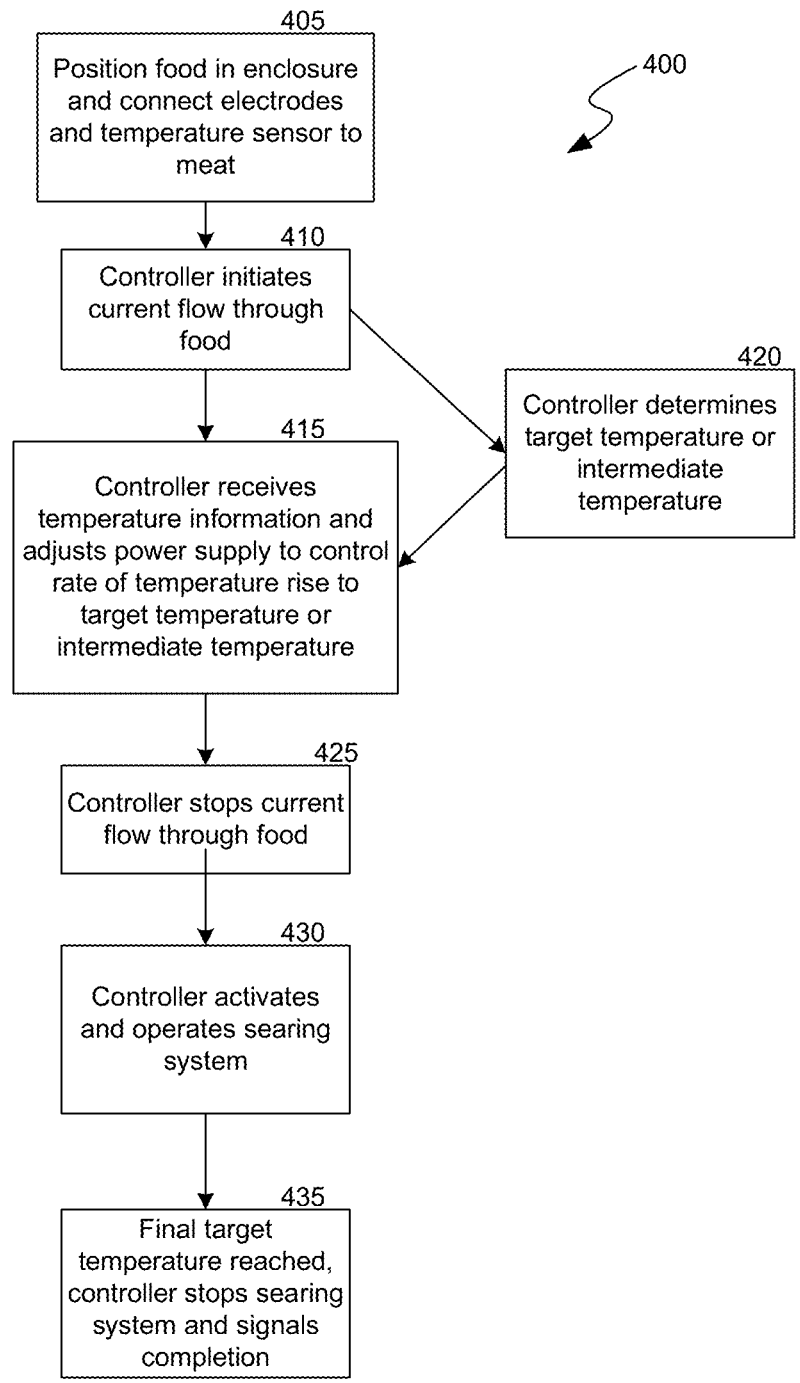
FIG. 4 is a flow diagram illustrating a method of cooking in accordance with embodiments of the present technology.

FIG. 4 is a flow diagram illustrating a method 400 of cooking in accordance with embodiments of the present technology. The controller 155 can be programmed with instructions that, when executed, carry out one or more aspects or steps of the method 400. Several of the steps described below include references to elements of FIGS. 1, 2A, 2B, and 3. At block 405, an operator positions the food 110 in the cooking zone 107, for example, on the suspension mechanism 205. The user/operator also connects the electrodes 145 to the food 110. In some embodiments, the suspension mechanism 205 can include a mechanism for automatically connecting the electrodes 145 onto the food 110 when the user/operator positions the food 110 in or on the suspension mechanism 205. The user/operator may also position the sensor 160 in or on the food 110, and/or an aspect of the suspension mechanism 205 can cause the sensor 160 to contact or penetrate the food 110.

Next, at block 410, the controller 155 instructs the power supply 150 to provide current flow through the food 110, and the power supply 150 provides the current flow. The food 110 begins heating as the electrical energy (via electric current and voltage) is converted to thermal energy via the impedance or resistance of the food 110. At block 415, the controller 155 modulates the power supply 150 such that the temperature of the food 110 increases. In some embodiments, the controller 155 receives temperature information about the food 110 from the sensor 160 and analyzes the temperature information to calculate the rate of temperature rise. The controller 155 can modulate the output of the power supply 150 to achieve a rate of temperature rise that causes the food 110 to reach a target temperature in a specified time. As explained above, the controller 155 can modulate the output of the power supply 150 based on other characteristics sensed by the sensor 160.

In an example implementation, if the food 110 is a steak, the controller 155 can modulate the output of the power supply 150 such that the steak reaches a target internal temperature of approximately 120 to 135 degrees Fahrenheit in one to two minutes. A faster rate of temperature rise may cause uneven heating, such as overcooking one portion while undercooking another (for example, due to large changes in impedance of the food 110 during cooking, which tends to cause a thermal runaway effect in the more rapidly heated areas). A slower rate of temperature rise facilitates redistribution of heat throughout the food 110 by thermal conduction. In some embodiments, the rate of temperature rise may be variable, such that the controller 155 reduces the rate of temperature rise as the food 110 approaches the target internal temperature. Such a variable rate may help minimize overall cooking time while maintaining evenness of cooking.

In some embodiments, the method 400 is deemed complete when the food 110 reaches the target internal temperature, which can be a final target internal temperature that corresponds to a desired "doneness" of the food 110 (e.g., meat is cooked medium-well or well done). However, in some embodiments, the method 400 can further include a searing process, such as a searing process that implements the hot oil cooking system 165 or a searing process that implements the photon cooking system 605 described below, or another searing process.

The searing process adds thermal energy to the food 110, which further increases the internal temperature of the food 110. In order to avoid overheating the food 110 with the searing process past the desired level of "doneness" (i.e., to avoid overcooking), the system can first cook to an intermediate internal temperature with the electrical conduction cooking system 135 before searing. The intermediate internal temperature is less than the final desired temperature associated with the desired "doneness" of the food 110 to allow for the additional heat added by the searing process, so that the electrical conduction and searing processes ultimately produce the desired final "doneness" of the food 110.

Accordingly, in some embodiments, the target internal temperature at block 415 can be an intermediate internal temperature that compensates for the additional heat that will be added by the searing process to arrive at a final target temperature. At block 420, which can be performed just before or during block 415, the controller 155 can determine the intermediate internal temperature. For example, the controller 155 can be programmed with instructions that, when executed, retrieve the intermediate internal temperature from a database stored in the memory 196, receive the intermediate internal temperature from the user interface 199 via input from a user, or otherwise determine the intermediate internal temperature.

The intermediate internal temperature may vary depending on the characteristics of the food 110. For example, smaller pieces of food 110 may need a lower intermediate internal temperature than larger pieces. This is because the smaller pieces of food 110 have more surface area relative to their volume, so they will experience greater internal heating during a searing process. Accordingly, the intermediate internal temperature is based on the heat capacity of the food 110, the amount of thermal energy added to the food 110 during the searing process (which is a function of the time and temperature of the searing process), and the final target internal temperature that corresponds to final desired "doneness" of the food. The difference between the intermediate internal temperature and the final target internal temperature is the amount of heat energy that will be input to the food 110 with the searing process.

In some embodiments, a user can input the heat capacity into the controller 155 via the user interface 199. In some embodiments, a user can input a mass of the food 110 into the controller 155 via the user interface 199, and the controller 155 can be programmed with instructions that, when executed, calculate the heat capacity based on the mass of the food 110 and a known specific heat value of the food 110. A database (such as a lookup table) in the memory 196 can include the specific heat capacity of one or more foods.

In some embodiments, the system and method can include determining the heat capacity of the food 110 based on observations of the food 110. For example, the controller 155 can receive temperature information from one or more temperature sensors 160 in contact with the food 110 (e.g., positioned within the food 110). The controller 155 collects the temperature information over time to determine a rate of temperature rise. The controller 155 compares the rate of temperature rise to the power input to the food 110 from the electrical conduction cooking system 135 to determine the heat capacity of the food 110 (e.g., by dividing the rate of temperature rise by the power).

To determine the intermediate internal temperature, the memory 196 can include a database (such as a lookup table) that contains intermediate internal temperatures associated with heat capacities, desired final target temperatures, and/or various searing times and temperatures. In some embodiments, such a database of intermediate internal temperatures can be populated based on empirical testing of various foods cooked to various final target temperatures. Accordingly, the controller 155 can be programmed with instructions that, when executed, retrieve the intermediate target temperature from the memory 196 based on the heat capacity and the desired final target temperature. In some embodiments, the controller 155 can calculate the intermediate internal temperature using a formula based on the heat capacity, the final target internal temperature, and/or the searing time and temperature. The formula can be determined via empirical testing of various foods.

In general, embodiments of the present technology can include determining, using a controller, the intermediate internal temperature based on the heat capacity of the food 110, the final target internal temperature of the food 110 (e.g., the desired temperature corresponding with final desired "doneness"), the duration of searing, and/or the temperature of searing.

Meat has relatively uniform specific heat (similar to water), so a rate of temperature rise of approximately one degree Fahrenheit per second per kilowatt of energy input correlates to a mass of approximately one pound of meat. Accordingly, a typical intermediate internal temperature for a 12-ounce steak may be 110 degrees Fahrenheit, while a 24-ounce steak may have an intermediate internal temperature of 120 degrees Fahrenheit.

There may be a lag time between applying power to the food 110 and sensing a temperature response in the food 110. Such a lag time may complicate determination of a sufficiently accurate rate of temperature rise, especially when cooking times are short (i.e., 2-3 minutes). Accordingly, in some embodiments, the power of the electrical conduction heating can be changed stepwise during the cooking process, and the controller 155 can measure the perturbation in the rate of change of the measured internal temperature of the meat resulting from this step-change in applied power, and based on that measurement, the controller 155 can calculate a prediction of the peak internal temperature which would result if the cooking process were ended at that time. Such a method compensates for temporal lag in measuring the temperature of the food 110 due to the food's thermal conductivity and improves the accuracy of the determination of heat capacity.

In some embodiments, the controller 155 is programmed with instructions that, when executed, determine the amount of energy required to reach the target internal temperature or the intermediate internal temperature and then delivers only that amount of energy to the food 110 via the electrical conduction cooking system 135. In some embodiments, a user can input the target internal temperature and/or the intermediate internal temperature via the user interface 199. Upon the food 110 reaching the target internal temperature (if searing is not to be performed) or the intermediate internal temperature (if searing is to be performed), at block 425, the controller 155 stops current flow through the food 110.

Next, at block 430, the controller 155 can operate a searing system such as the hot oil cooking system 165 or another searing system disclosed herein. During the searing process, the temperature sensor 190 (see FIG. 3) within the enclosure 105 can sense the temperature inside the enclosure 105 and send a signal representative of the temperature to the controller 155. In response to the signal from the temperature sensor 190, the controller 155 can operate the enclosure heating system 195 to keep the walls of the enclosure 105 at a specified temperature that controls (e.g., optimizes) the searing of the food 110. For example, in the case of meat, the oil 175 is cooled by its contact with the meat itself, but the oil must be kept well above 325 degrees Fahrenheit to rapidly cause Maillard browning of the meat. Preferably, the oil 175 is kept as hot as possible without smoking, so in some embodiments, the oil can be kept close to its smoke point. The walls of the enclosure 105 may not be able to transfer heat to the oil 175 fast enough to keep it properly heated without the wall surface temperature exceeding the smoke point of the oil 175 and causing undesirable degradation and formation of residual deposits. Accordingly, the controller 155 can optionally maintain the walls of the enclosure 105 at the highest acceptable temperature for the cooking oil being used (for example, 350 degrees to 425 degrees Fahrenheit, depending on the oil), while modulating the temperature of the injected hot air 185 to keep the oil 175 at the temperature suitable for searing.

The searing process at block 430 can continue while the food 110 approaches the final target internal temperature, as sensed by the sensor 160 in contact with the food 110. In some embodiments, the final target internal temperature is approximately five to ten degrees below the temperature at which the food 110 would reach its desired doneness. This is because the food 110 may rise a few more degrees just after searing while resting in the enclosure 105. In some embodiments, the intermediate internal temperature is selected such that the food 110 reaches its final target internal temperature after one to three minutes of searing, depending on the desired intensity of the sear (i.e., the color and crispness). In some embodiments, another air input above the level of oil in the reservoir 170 can add air to the enclosure 105 to cool the enclosure 105 to reduce the amount of cooking that occurs just after the searing process is stopped. For example, the system 100 can include an input of air at a temperature slightly lower than the desired final internal temperature of the food 110 (e.g., 115 degrees Fahrenheit), to flush out hotter air and reduce overheating while maintaining warmth of the finished food 110.

At block 435, the controller 155 senses that the food 110 has reached the final target internal temperature, and the controller 155 stops operation of the searing system. The controller 155 can cause a device to issue a signal to an operator that the cooking process is complete (e.g., by a visual and/or auditory output from the user interface 199). The user/operator may then remove the cooked food 110 from the enclosure 105. Although temperature is described as a control parameter for stopping the cooking processes (including the searing processes), in other embodiments, other factors may determine when to stop and/or how to control the cooking processes, such as time, electrical characteristics sensed by the power supply 150 or another sensor (such as electrical impedance, electrical resistance, electrical reactance, electrical capacitance, dielectric constant, and/or dielectric loss), food optical reflectivity, and/or food hardness. The sensor 160 can be configured to measure each of these characteristics and the controller 155 can control cooking in a closed-loop process based on any one or more of these characteristics.

Although the method 400 can include stopping the conduction cooking process before beginning the searing process, in some embodiments, the conduction cooking process can continue during the searing process, or the searing process can begin at the same time as the conduction cooking process, or the conduction and searing processes can otherwise overlap in time. In some embodiments, the controller 155 can adjust operating parameters of each subsystem (such as heating rates) to begin and/or end conduction cooking and searing at the same time. Optionally, the conduction cooking process can be paused while temperature measurements are taken with the sensor 160 to avoid errors that may be caused by heating, electrical interference within the food 110, or the thermal time constant of the sensor 160 and/or the food 110.

Advantages of the system 100 and the method 400 include cooking food 110 precisely and quickly. For example, systems and methods according to embodiments of the present technology can cook a steak to a desired level of doneness in two to five minutes. The system 100 can cook an entire standing rib roast or other large cut of meat to a specified target temperature in minutes, which is far less time than conventional meat-cooking methods. This is because a typical cooking method for large portions of meat only adds heat to the exterior of the meat, which requires low temperature cooking for long periods of time. In contrast, embodiments of the present technology can heat the internal regions of the meat without relying necessarily on thermal transfer from the surface. In a further example, systems and methods according to embodiments of the present technology can cook barbecue (such as brisket or pork shoulder) by bringing the internal temperature to approximately 180 degrees Fahrenheit in a matter of tens of minutes, optionally using multiple circuits 140. After the internal temperature is reached, the barbecue meat can be smoked in a conventional smoker until it reaches a final temperature of 190 to 205 degrees Fahrenheit. Accordingly, a complete smoked brisket can be produced in less time than conventional methods.

Figure 5:
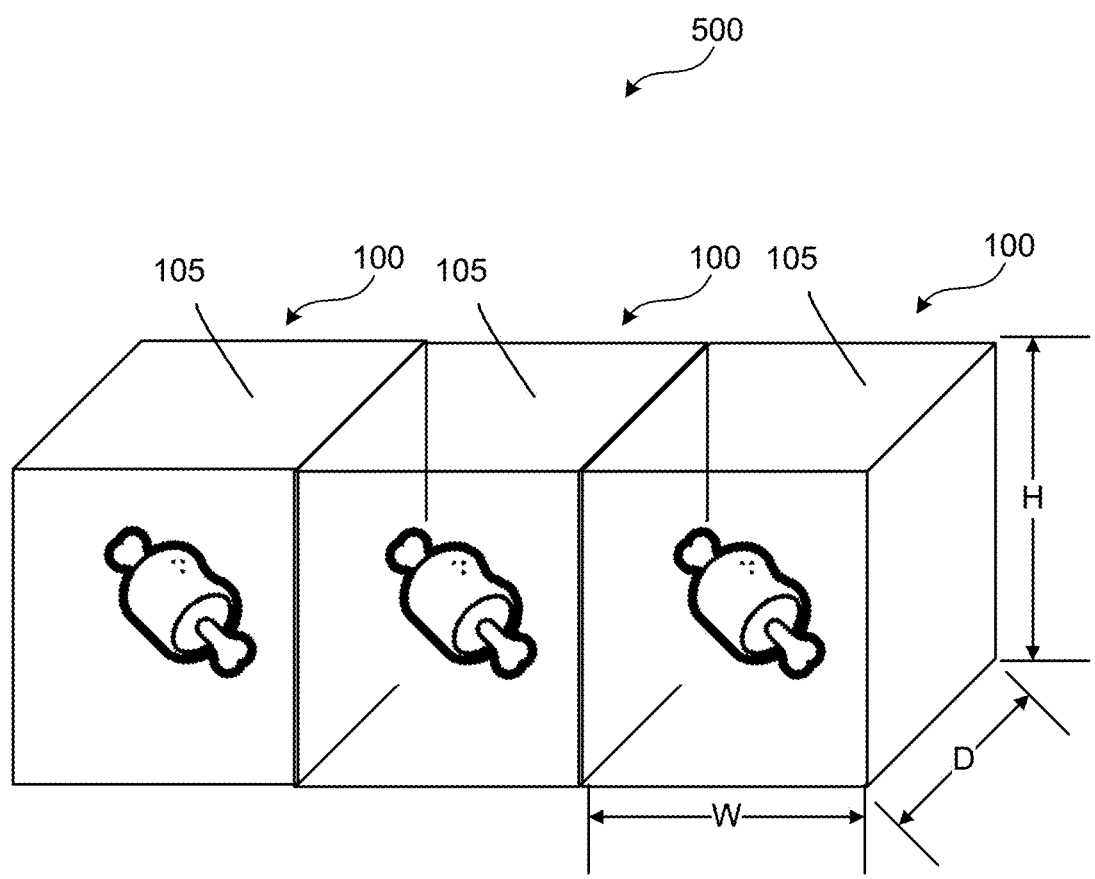
FIG. 5 illustrates a partially schematic isometric view of a cooking system configured in accordance with embodiments of the present technology.

FIG. 5 illustrates a partially schematic isometric view of a system 500 configured in accordance with embodiments of the present technology. The system 500 can include a plurality of systems 100 for cooking food described above. For example, the system 500 can include multiple adjacent enclosures 105 or systems 100, each with its own corresponding subsystems (e.g., the electrical conduction cooking system 135, the hot oil cooking system 165, the enclosure heating system 195 described above with regard to FIGS. 1-3, a photon cooking system 605 described below, and/or other systems). In some embodiments, each enclosure 105 may have a width W of approximately three inches, a depth D of approximately six inches, and a height H of approximately eight inches, or other suitable dimensions.

The system 500 can automatically cook multiple separate servings or portions of food (e.g., meat) simultaneously, including different types of food and/or different levels of doneness in each adjacent system 105. Accordingly, systems 500 configured in accordance with embodiments of the present technology can complete all or approximately all of an order of steaks for multiple consumers. In some embodiments, the controller 155 can adjust the rate of heating to finish the different steaks at the same time. A plurality of systems 500 can be linked to each other via their controllers 155 to cook an arbitrarily large number food items simultaneously (e.g., for banquets or other large events).

Cooking (Searing) with Photon Sources

Several embodiments of the present technology heat material by emitting light (photons) toward and onto the material, whereby the light energy is converted to thermal energy upon absorption of the light energy into the material. An example material can include food 110. Accordingly, some embodiments of the present technology cook food (e.g., sear the food) by emitting light (photons) toward and onto the food 110, whereby the light energy is converted to thermal energy upon absorption of the light energy into the food 110. A representative system configured in accordance with embodiments of the present technology can include an array of semiconductor light sources positioned to direct light toward a cooking zone for the food 110. The semiconductor light sources can include laser diodes and/or light-emitting diodes (LEDs). The semiconductor light sources can produce wavelengths of light in the visible, near-infrared, and/or short-infrared spectrum. In some embodiments, the semiconductor light sources can include emitters of different wavelengths and/or wavelength-converting phosphors to illuminate the cooking zone with multiple wavelengths. Systems can operate the different semiconductor light sources depending on the intensity or wavelength needed to heat the material (food). Generally, photons having wavelengths between 400 nanometers and 14 microns can sear food, although in various embodiments other wavelengths or ranges of wavelengths can be implemented.

Figure 6:
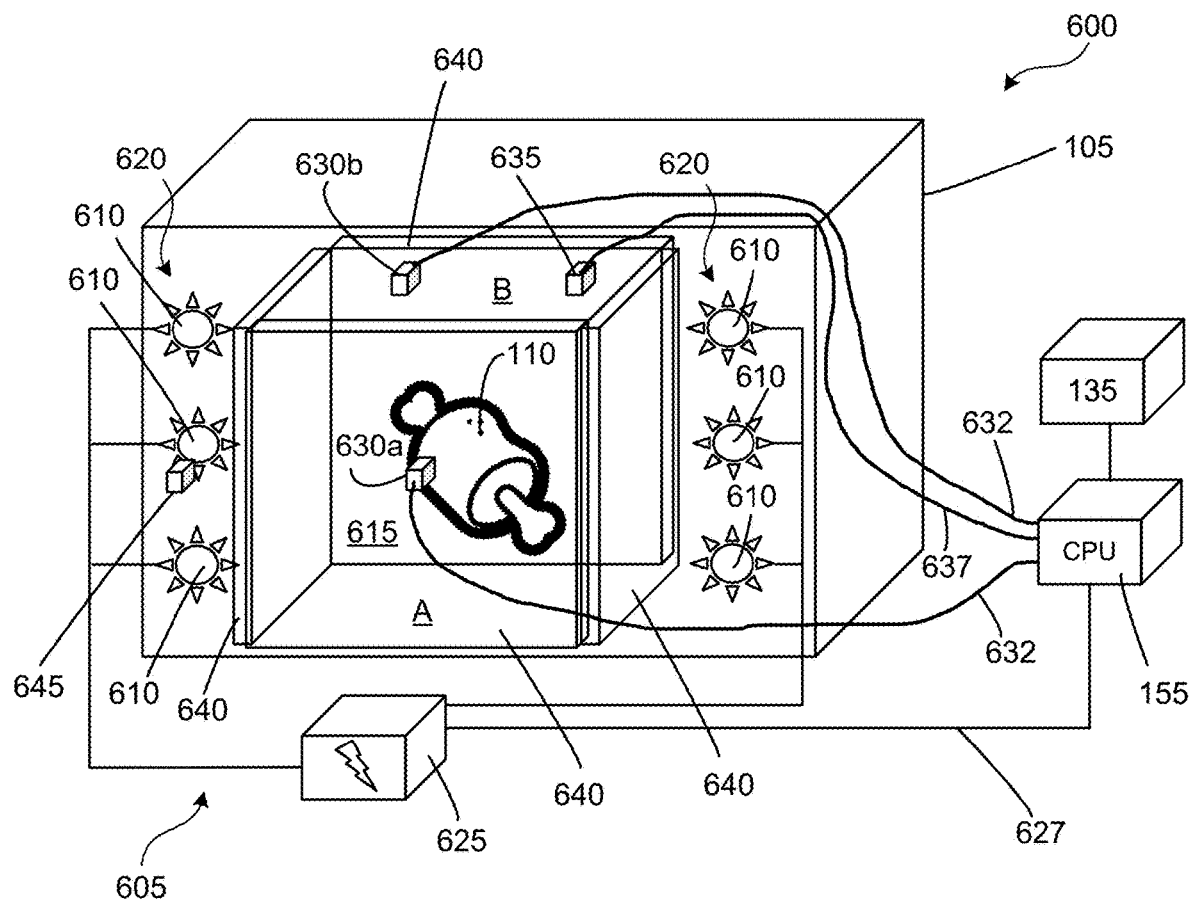
FIG. 6 illustrates a partially schematic isometric view of a system for cooking food, configured in accordance with embodiments of the present technology.

FIG. 6 illustrates a partially schematic isometric view of a system 600 for cooking food 110, configured in accordance with embodiments of the present technology. The system 600 can be generally similar to the system 100 described above with regard to FIGS. 1-5. For example, it can include an enclosure 105 that receives and supports the food 110 (e.g., with a suspension mechanism 205, see FIG. 2A) and an electrical conduction cooking system 135. FIG. 6 only shows a schematic representation of the electrical conduction cooking system 135, but it is understood to be similar to the electrical conduction cooking system 135 shown and described above with regard to FIGS. 1-3. In addition to the hot oil cooking system 165, or as an alternative to the hot oil cooking system 165, the system 600 can include a photon cooking system 605 (which may also be called an optical cooking system) to cook (e.g., sear) the exterior surface of the food 110.

The photon cooking system 605 includes one or more bulk photon sources 610 positioned to illuminate a surface for which heating is desired, such as the surface of the food 110 in a cooking zone 615 within the enclosure 105. The bulk photon sources 610 dose the surface of the food 110 with photons (light energy), which are absorbed into the food 110 and converted to thermal energy that sears the surface or otherwise cooks the surface to achieve a surface characteristic. Accordingly, cooking the exterior surface using one or more bulk photon sources 610 can also be described as radiant broiling or optical searing, and the bulk photon sources 610 can be described as forming a radiant broiler. The photon cooking system 605 can sear the food 110 while facilitating rapid termination of the searing without having to remove the food 110 from the enclosure 105, at least in part because termination of the photon sources ends the input of energy into the surface of the food 110 nearly instantaneously.

The bulk photon sources 610 can include semiconductor light sources. Examples of suitable semiconductor light sources include LEDs and/or laser diodes, although systems configured in accordance with various embodiments of the technology can additionally or alternatively include other sources of photons suitable for providing photons to a light-absorptive target in a manner that heats the target to a sufficient degree that the characteristics of the target are changed by the heat (e.g., searing).

One or more of the bulk photon sources 610 emit wavelengths of light (photons) that match or otherwise generally correspond to the light absorption spectrum of the food 110. Matching the emission of the bulk photon sources 610 to the light absorption characteristics of the food 110 provides sufficient (e.g., optimal or maximal) energy input into the surface of the food 110 to sear the food 110. The matching does not have to be exact.

For example, some foods, such as meats, have an absorption peak in the range of 400 to 500 nanometers. Accordingly, in some embodiments, the bulk photon sources 610 can include high power blue laser diodes operating near 450 nanometers. The radiant flux of such laser diodes provides sufficient radiant flux to sear the meat. Some systems configured in accordance with embodiments of the present technology can include blue LEDs emitting light at approximately 450 nanometers toward the meat. In further embodiments, systems can include LEDs emitting other wavelengths of light (for example, by using a phosphor layer tailored to convert blue LED emission to longer wavelengths, such as white light or infrared radiation). Generally, the bulk photon sources 610 can be selected, modified, and/or controlled to provide one or more wavelengths (such as a plurality of wavelengths) of light that correspond to the absorption spectra of one or more foods (such as types of meat), and/or to improve visible lighting of the food during cooking.

The bulk photon sources 610 can be tailored to the light absorption characteristics of the food 110 in one or more ways. For example, they can be initially selected as off-the-shelf components that emit light corresponding to the light absorption characteristics of the food 110 and/or they can be modified from their original off-the-shelf designs/specifications. In some embodiments, the bulk photon sources 610 can include LEDs with or without modifying layers over the LED junctions (such as phosphor layers) which modify the wavelength of the light output from the LED junctions. In some embodiments, as described in additional detail below, aspects of the photon cooking system 605 can control the bulk photon sources 610 to emit one or more specific wavelengths as necessary for matching the absorption characteristics of the food 110. For example, the bulk photon sources 610 can include two or more subgroups of the bulk photon sources 610 that are tuned to various wavelengths and the system can modulate the subgroups of bulk photon sources 610 with the appropriate (matching) wavelengths to output different intensities. Each subgroup can include a plurality of bulk photon sources 610 that constitutes less than the full quantity of bulk photon sources 610, or a subgroup can include a single bulk photon source 610. In some embodiments, the photon cooking system 605 can control laser diodes in a manner that causes them to emit one or more appropriate (matching) wavelengths. Laser diodes or LEDs and/or subgroupings of laser diodes or LEDs can output multiple wavelengths that the photon cooking system 605 separately controls to modulate the spectral output directed at the food 110.

In some embodiments, a plurality of bulk photon sources 610 are distributed around the cooking zone 615 to mimic the nondirectional emission of radiation from a blackbody radiator. For example, the bulk photon sources 610 can be positioned and/or arranged such that the emissions of each bulk photon source 610 at least partially overlaps with emissions from another bulk photon source 610 at the surface of the food 110. The bulk photon sources 610 can be positioned and arranged to produce a homogenous or generally homogenous field of radiation in the cooking zone 615 and/or at the surface of the food 110. For example, the photon cooking system 605 can include two or more (such as four) arrays 620, each including a plurality of bulk photon sources 610.

FIG. 6 illustrates two arrays 620 positioned on two opposing sides of the cooking zone 615. FIG. 6 only shows two arrays 620 in order to avoid obscuring the illustration in FIG. 6. However, in some embodiments, two more arrays 620 are positioned transversely or orthogonally to the illustrated arrays 620, to generally surround the cooking zone 615 (e.g., arrays 620 at two other opposing sides A, B of the cooking zone 615). In further embodiments, the system 600 can include any suitable number of arrays 620 to bathe the food 110 in light from the arrays 620 (e.g., six arrays 620 arranged as a box, or a grouping of arrays 620 forming a polyhedron around the cooking zone 615). In some embodiments, the arrays 620 can surround the cooking zone 615 in a spheroidal or ellipsoidal configuration. The present technology facilitates cooking all over a food surface or substantially all over a food surface rather than in a single location or on a single side, for example, by positioning bulk photon sources 610 to illuminate most of a surface or even all of a surface of the food 110.

The photon cooking system 605 can further include a power supply 625 connected to the bulk photon sources 610 to modulate the light intensity (heating power) from the bulk photon sources 610. The photon cooking system 605 can further include a controller, such as the controller 155, for automatically or semi-automatically controlling the power supply 625 and/or the bulk photon sources 610 via a photon cooking control signal 627.

The photon cooking system 605 can include one or more sensors connected to the controller 155 for observing data about the food 110 and/or the cooking zone 615. The controller 155 can collect and/or receive such data and adjust the operation of the photon cooking system 605 based on the data, for example, using one or more closed-loop processes. The data can include a surface temperature of the food 110, internal temperature of the food 110, spectral absorption characteristics of the food 110, and/or other data. The operational adjustments of the photon cooking system 605 can include varying the power level (light intensity), changing the spectral output (wavelength(s)) of the bulk photon sources 610, varying the timing of cooking activities, and/or varying other operating parameters.

Specifically, for example, the sensor 160 (see FIG. 1) can sense the internal temperature of the food 110. One or more temperature sensors 630a, 630b can sense the surface temperature of the food 110 and provide surface temperature signals 632 to the controller 155. The sensor 630a can include a thermometer positioned on the surface of the food. The sensor 630b can include a non-contact temperature sensor, such as an infrared temperature sensor or a thermal camera. Although one sensor 630b is illustrated, the system 600 can include a plurality of sensors 630b distributed around the cooking zone 615, and they can optionally be arranged in one or more arrays. The photon cooking system 605 can include an absorption spectrum sensor 635, such as an optical spectrometer, a photometric device, or another suitable sensor for determining absorption spectrum characteristics of the material (food 110). Some or all of the sensors (e.g., the sensors 160, 630a, 630b, 635) can be connected to the user interface 199 (see FIG. 1) to display information from the sensors, such as an internal temperature of the food 110 and/or a surface temperature of the food 110.

In some embodiments, the controller 155 is programmed with instructions that, when executed, cause the controller 155 to receive temperature information from the one or more temperature sensors 630a, 630b and, in response to the temperature information, control the output (intensity) of the bulk photon sources 610. For example, the controller 155 can be programmed with instructions that, when executed, perform closed-loop or other control to modulate the output intensity of the bulk photon sources 610 to raise or lower the heating power during the cooking process based on the temperature information from the sensors 630a, 630b. Closed-loop control mechanisms can include hysteretic control, proportional-integral-derivative control, proportional-integral control, proportional-derivative control, on/off control, or other control mechanisms suitable for the controller 155 to receive temperature information about the food 110 and modulate the photon cooking system 605 to result in a selected heating rate, rate of energy delivery, and/or final temperature.

Some embodiments of the present technology can perform preferential heating of one or more specific portions of the surface of the food 110. For example, systems that include a thermal camera and/or an array of non-contact infrared temperature sensors as the sensor(s) 630b can control intensity of the photon sources 610 individually or in subgroups. The thermal camera and/or array of non-contact infrared temperature sensors can collect a thermal image of the surface and transmit the thermal image to the controller 155 as a thermal profile of the material (food) comprising temperature data for multiple locations on the material. The controller 155 analyzes the thermal profile to identify one or more areas of the surface that should receive more or less intensity depending on the temperature required to cook the surface. The controller 155 then modulates one or more of the bulk photon sources 610 (such as a subgroup of bulk photon sources 610 that are emitting toward the identified areas) independently of the others. In other words, the controller 155 can modulate a first subgroup of the bulk photon sources 610 differently than a second subgroup of bulk photon sources 610 in response to the thermal profile of the surface of the food 110. Accordingly, the one or more sensors 630b enable control of intensity of bulk photon sources 610 that correspond to specific areas or regions of the surface of the food 110.

In some embodiments, the power supply 625 and/or the controller 155 modulate the output wavelengths of the bulk photon sources 610 to control the spectral distribution within the cooking zone 615 (e.g., to match the output to the absorption peak of some or all of the surface of the food 110). The controller 155 can receive absorption spectrum data from the user interface 199, from the absorption spectrum sensor 635, or from another source. The controller 155 can be programmed with instructions that, when executed, compare the absorption spectrum data (e.g., a peak absorption wavelength) to emission spectrum data of one or more of the bulk photon sources 610 (e.g., a peak emission wavelength) and cause the bulk photon sources 610 to output an emission spectrum (e.g., the peak emission wavelength) that corresponds to (e.g., matches) the absorption spectrum (e.g., a peak absorption wavelength) of the material or food 110.

For example, the absorption spectrum sensor 635 measures the absorption spectrum of the surface of the food 110 and provides the absorption spectrum data to the controller 155 via a spectrum signal 637. In response to the absorption spectrum data, the controller 155 can cause the bulk photon sources 610 to emit wavelengths that correspond to the absorption spectrum of the food 110. In some embodiments, the controller 155 can cause the absorption spectrum sensor 635 to measure the absorption spectrum a plurality of times to dynamically adjust the output of the bulk photon sources 610 during a cooking process. In further embodiments, absorption spectrum information may be input into the controller 155 from an external database containing such information for various foods, measured by a user and input into the controller 155, or visually estimated by a user and input into the controller 155 (for example, via the user interface 199 or a communications interface connected to the controller 155). In some embodiments, the memory 196 can include a database of absorption spectrum information for various foods 110 and/or levels of cooking of the foods 110. A user can input the food into the user interface 199 and the controller 155 can sear the food based on the absorption spectrum information from the memory 196 (e.g., by modulating the bulk photon sources 610 to emit light that is preferentially absorbed by the material in the heating/cooking zone, such as the food 110).

As described above, the bulk photon sources 610 can include two or more subgroups of the bulk photon sources 610 that are each tuned to different wavelengths. In response to the absorption spectrum data, the controller 155 can modulate a first subgroup differently than a second subgroup. For example, the controller 155 can increase the intensity of a subgroup of bulk photon sources 610 having wavelengths that correspond to the absorption spectrum of the food 110 and decrease the intensity of other subgroups.

The photon cooking system 605 can perform the spectral adjustment before the cooking process or during the cooking process to automatically modulate the spectral output in response to shifting light absorption characteristics of the food 110 as it cooks. In some embodiments, the system includes multiple absorption spectrum sensors 635 for multiple regions of the cooking zone 615 and/or the absorption spectrum sensor includes a thermal camera device or array of non-contact infrared temperature sensors that provides a two-dimensional representation of the field of absorption spectra to target the spectral adjustment to particular portions of the surface of the food 110 (e.g., by adjusting the bulk photon sources 610 or subgroups of bulk photon sources 610 that illuminate the particular portions of the surface).

The photon cooking system 605 can optionally include one or more light transmissive panels 640, each light transmissive panel 640 being positioned between the bulk photon sources 610 and the cooking zone 615 (which contains the food 110). The light transmissive panels 640 can function as windows that protect the bulk photon sources 610 from the food 110. In some embodiments, the light transmissive panels 640 can form some or all of the walls of the enclosure 105 (such that the bulk photon sources 610 are positioned outside of the enclosure 105), and they can protect the food 110 from the outside environment. The light transmissive panels 640 can be optically transmissive, and/or they may be transmissive of non-visible light. The light transmissive panels 640 may be made from any suitable material, such as glass-ceramic, borosilicate glass, sapphire, or other materials. In some embodiments, bulk photon sources 610 can be positioned to surround the food 110 by positioning the food on or above a light transmissive panel 640 above some of the bulk photon sources 610, and by positioning other bulk photon sources 610 beside and above the food 110.

In some embodiments, the photon cooking system 605 can include one or more optical devices to modify the output of the bulk photon sources 610 before it reaches the food 110. Such an optical device can include one or more of the light transmissive panels 640 and/or an optical device included in (or attached to) the bulk photon sources 610, such as in an LED or laser diode assembly. For example, an optical device attached to the bulk photon sources 610 can include a lens, diffuser, and/or a micro-optic device. Such optical devices can facilitate longer working distances and/or higher intensities at the cooking surface of the food 110 than can a bare LED or laser junction. In some embodiments that include laser diodes or LEDs as the bulk photon sources 610, optics (such as micro-optics) can be positioned between each bulk photon source 610 and the cooking zone 615 (the food 110) to produce an incoherent field of overlapping beams with consistent spatial distribution of intensity at the cooking surface of the food 110.

In some embodiments, the spacing and/or arrangement of the bulk photon sources 610 are configured based at least in part on their light emission angles (beam divergence) to achieve a desired uniformity of light intensity on the food 110 and/or in the cooking zone 615. Optical elements placed between the bulk photon source 610 (emitter) and the food 110 can affect the spacing between emitters, the working distance to the cooking surface of the food 110, and/or the ratio between the spacing and the working distance. In some embodiments, the optical elements can have a one-to-one correspondence to the bulk photon sources 610, such as fast-axis collimating lenses on laser diode emitters. In further embodiments, the optical elements can each process light from multiple bulk photon sources 610, such as a lenticular lens array or microlens homogenizer. Such optical elements may enhance (e.g., optimize) the overlap of irradiation from adjacent bulk photon sources 610 upon the surface to be heated to provide generally uniform photon flux through the surface. In some embodiments, one or more of the bulk photon sources 610 can include reflective or refractive optics to shape the emission pattern for uniformity of illumination/radiation. Generally, embodiments of the present technology include bulk photon sources 610 and modifications, arrangements, and/or positions of the bulk photon sources 610 that result in diffuse output onto the material to be heated instead of a focused (e.g., collimated)

beam of light. For example, the output can form an incoherent field of diffuse light that results in a uniform distribution of intensity of visible and/or non-visible light on the surface of the material (e.g., the food 110).

In some embodiments, the spacing and/or arrangement of the bulk photon sources 610 are configured to achieve a power density which can be accommodated using thermal management techniques for power semiconductors. Some embodiments include one or more thermal management systems 645 thermally connected to the bulk photon sources 610 and/or the arrays 620 to remove waste heat, such as heatsinks, heat pipes, water-cooled plates, and/or other suitable thermal management devices or techniques.

In operation, the system 600 can perform a method similar to the method 400 described above with regard to FIG. 4, except that the steps involving the hot oil cooking system 165 and the enclosure heating system 195 can be omitted and replaced with steps involving the photon cooking system 605. Because the photon cooking system 605 also adds heat to the food 110, the method can also involve heating the food 110 to a target intermediate temperature in blocks 410 through 425 (see FIG. 4), and then activating the photon cooking system 605 as the searing system in block 430 until the final target internal temperature is reached at block 435 and/or the desired level of sear is reached. The target intermediate temperature may be different when using the photon cooking system 605 as opposed to the hot oil cooking system 165.

In some embodiments, during operation (i.e., in block 430), at least one of the sensors 630 (such as the non-contact temperature sensor 630*b*) senses the surface temperature of the food 110. As the searing process continues, the controller 155 varies the power of the bulk photon sources 610 (via the power supply 625) to achieve and maintain a surface temperature suitable for searing/browning the food 110, such as between 325 degrees Fahrenheit and 400 degrees Fahrenheit for meat. The controller 155 maintains the surface temperature until the surface reaches the desired level of searing using closed-loop control. For example, if the food 110 is meat, the controller 155 reduces the power output from the bulk photon sources 610 to compensate for the increasing light absorption characteristics and decreasing thermal conduction characteristics of the meat as it browns and loses surface moisture, which avoids overheating and/or burning. In other embodiments, systems can perform modulation of the bulk photon sources 610 without closed-loop control. In embodiments without closed-loop control, the system can operate the process based on a pre-set process duration and pre-set light intensity to reach the desired level of searing. For example, the system 600 can include a basic timer as the controller 155 and/or an operator can manually control duration and intensity via the user interface 199. The duration and intensity can be determined empirically for various foods prior to operating the system.

In some embodiments, in response to the absorption spectrum data, the controller 155 can determine whether the surface is sufficiently "done" (sufficiently seared/cooked). For example, the memory 196 associated with the controller 155 can include a database of absorption characteristics for various foods 110 and/or levels of cooking of the foods 110, and it can determine if the food 110 being cooked has the desired level of cooking (e.g., by comparing the absorption spectrum data to known absorption spectrum data associated with various foods and/or levels of cooking). In response to such a determination, the controller 155 can turn off the photon cooking system 605 and optionally operate the user interface 199 (see FIG. 1) to alert an operator that searing is complete. Accordingly, the controller 155 can end the searing process automatically based on the absorption spectrum data, automatically after a pre-set amount of time, or as a result of input from a user to the controller 155 commanding that the searing process ends.

Although in some embodiments, the system 600 can include the electrical conduction cooking system 135, in other embodiments, the system 600 can omit the electrical conduction cooking system 135 and the system 600 can serve as a standalone searing or broiling device. In yet further embodiments, aspects of the system 600 can perform reflow soldering processes or other processes that involve heating materials, as explained in additional detail below.

Figure 7:
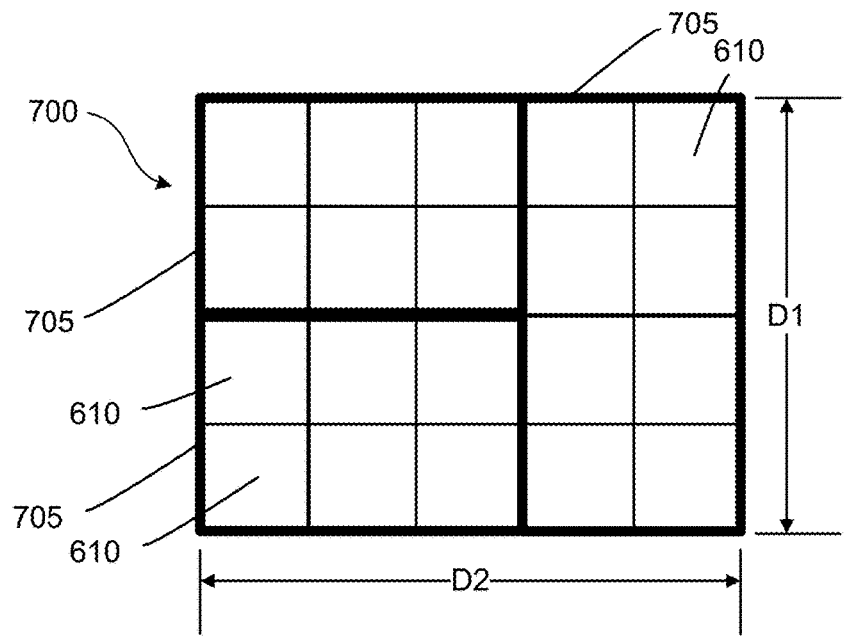
FIG. 7 illustrates a partially schematic front view of an array of bulk photon sources configured in accordance with embodiments of the present technology.

FIG. 7 illustrates a partially schematic front view of an array 700 of bulk photon sources 610, configured in accordance with embodiments of the present technology. The array 700 is suitable for implementation as the array 620 in the photon cooking system 605 described above with regard to FIG. 6. Accordingly, some embodiments of the system 600 include the arrays 700 illustrated in FIG. 7 as the arrays 620 described above. In some embodiments, each array 700 can include hundreds or thousands of semiconductor light sources as the bulk photon sources 610 (only three are labeled in FIG. 7 to avoid obscuring the illustration with additional labels). The semiconductor light sources can be arranged and spaced such that the emission patterns from adjacent emitters overlap upon the material to be heated, such as the food surface.

According to some aspects, the LED junctions may emit light having a wavelength of 405 nanometers to 480 nanometers (such as 450 nanometers). The array 700 may have dimensions D1×D2 of approximately four inches by six inches. The array 700 may produce a maximum of two to three kilowatts of power. In a system 600 (see FIG. 6) that includes four arrays 700, the arrays 700 can collectively emit approximately eight to twelve kilowatts of power. Optionally, the LED junctions can be phosphor-converted to a color temperature between 4500K and 6000K. Although specific values and dimensions are presented herein regarding characteristics of the LED junctions and the arrays 700, such values and dimensions are for example only and other embodiments may have other values.

As described above, in some embodiments, the systems control the bulk photon sources 610 to modulate their intensity and/or spectral output (wavelengths). In some embodiments, the array 700 can include two or more subgroups 705. Each subgroup 705 can include less than the full quantity of the bulk photon sources 610 within the array 700. A subgroup 705 can include one or more bulk photon sources 610, such as one or more LED junctions or one or more laser diodes. In some embodiments, the subgroups 705 can output different wavelengths from one another, and the controller 155 can adjust the subgroups 705 to increase or decrease the intensity of a wavelength that corresponds more to the type of food or material for heating. The controller 155 is connected to the subgroups 705 to modulate each subgroup 705 together or independently of one another, in the same way or in different ways.

In embodiments that implement LEDs as the bulk photon sources 610, the LEDs can include chip-on-board technology to pack many separate LED junctions into arrays 700 on a shared thermal management substrate. By packing a plurality of arrays 700 of LEDs together (in an array of arrays, a two-dimensional array, or a matrix), the achievable optical flux through the overall area of the arrays 700 can be within the range of power densities suitable for broiling or surface-searing (for example, approximately ten to twenty watts per square inch). In some embodiments, off-the-shelf 100-watt blue LED arrays (emitting light at approximately 450 nanometers) trimmed to an overall package dimension of 40×40 millimeters produce sufficient heat for cooking across an area at least as large as the array 700 itself. For example, 1500 watts of blue LED arrays works for cooking. A further embodiment for searing food (meat) can include four water-cooled 2200 watt arrays 700 measuring ten by ten centimeters, and having phosphor-converted blue LEDs emitting white light at 4500K, in which the arrays 700 are arranged around a cube-shaped cooking chamber with glass-ceramic walls.

In an example use, a representative system configured in accordance with embodiments of the present technology, with 1500 watts of blue LED arrays, was used to cook bacon crispy in 4 minutes, and the cooking rate was successfully adjusted by varying the LED power. A three-millimeter glass-ceramic window was used, placed directly against the LED array, with a 40-millimeter distance between the LEDs and the bacon. The window remained sufficiently cool that residue did not burn onto the surface and was easy to remove. In another example, four water-cooled 2200 watt arrays measuring ten by ten centimeters, and having phosphor-converted blue LEDs emitting white light at 4500K, were arranged around a cube-shaped cooking chamber with three-millimeter thick glass-ceramic walls to sear beef, exhibiting uniform heating and instant modulation and termination of cooking.

Some features of several of the embodiments described above, and with other embodiments configured according to the present technology, is that heating (cooking) is stopped immediately or nearly immediately when the system is turned off, and adjustments in power (up or down) applied to the food 110 are also immediate or nearly immediate. This is in contrast with systems that heat (cook) with blackbody radiation sources, which stay hot even when power is removed, and which heat surrounding components that also continue radiating heat when power is removed. Systems configured in accordance with embodiments of the present technology can include a timer to turn off the system or otherwise remove power from the cooking subsystems, and because the cooking process ends immediately or nearly immediately upon the subsystems being turned off, a user's attention is not immediately required to attend to the food (e.g., a user does not need to immediately remove the food from the system). Another contrast with blackbody radiation heat sources is that embodiments of the present technology may be spectrally tuned to match the wavelength of the bulk photon sources 610 to the absorption spectrum of the food 110 being cooked (e.g., the wavelength associated with beef or the wavelength associated with pork), which can improve efficiency and speed of the cooking process.

Another feature of the present technology is that it facilitates improved management of the heat that does not necessarily contribute to cooking the food. For example, conventional blackbody heating elements produce wasted thermal energy that can heat conventional equipment and the surrounding environment. In conventional equipment, wasted heat transfers to nearby equipment and surfaces, which poses a safety hazard or renders a kitchen environment more uncomfortable. Some systems configured in accordance with embodiments of the present technology can manage waste heat with cooling systems, such as the thermal management system 645 described above with regard to FIG. 6. Accordingly, heat from embodiments of the present technology is easier to manage and poses fewer hazards at least in part because temperatures can be reduced and the thermal paths can be controlled.

As a further feature, the bulk photon sources may not heat a plate as much as food on the plate because the plate may not absorb significantly at the wavelength of the bulk photon sources. In contrast, a conventional blackbody heat source indiscriminately heats everything in its range, including the plate and viewing windows into the enclosure, leading to baked-on food residue and plates that may be too hot to handle without additional precautions. Therefore, systems implementing the photon cooking system 605 have reduced risk of food burning onto plates, viewing windows, or other components because the bulk photon sources 610 can produce far less (or even negligible) blackbody radiation that heats components other than the food itself.

In some embodiments, specific wavelengths of light can be used to facilitate different levels of heating of different foods on the same plate inside the cooking zone 615. For example, blue light is generally absorbed by meats but generally not by green vegetables. This allows a meat product to be heated intensely without burning adjacent vegetables. This system is advantageous over systems that use heat lamps, which do not enable differential heating of different foods exposed to the same light.

Incandescent Searing

Although some embodiments use bulk photon sources that do not necessarily contribute sufficient blackbody radiation or thermal radiation to heat food (such as semiconductor light sources described above), in some embodiments, the bulk photon sources can include an incandescent material that is heated with electricity or combustion of a fuel gas.

Figure 7A:
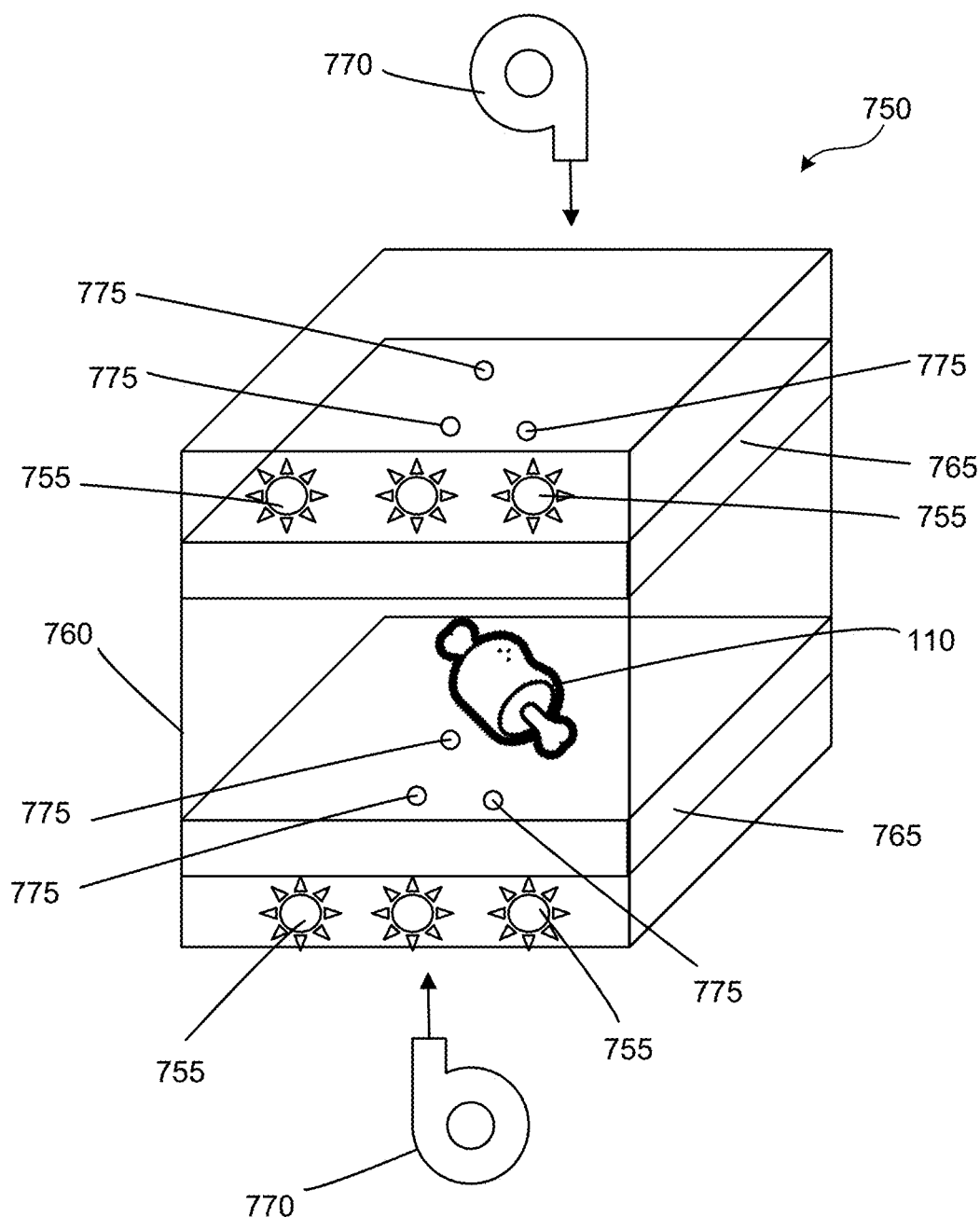
FIG. 7A illustrates a schematic top view of an incandescent searing system configured in accordance with further embodiments of the present technology.

FIG. 7A illustrates a schematic top view of an incandescent searing system 750 configured in accordance with further embodiments of the present technology, in which the bulk photon sources include incandescent light sources 755 or other incandescent materials. The food 110 can be suspended in an enclosure 760 that includes walls 765 formed with a transparent heat resistant material (which can protect the light sources from residue). A suitable material includes glass-ceramic or other transparent materials disclosed herein. The photons are emitted onto the food 110 from the incandescent light sources 755.

A representative incandescent light source 755 can include tungsten-halogen lamps. In embodiments that include incandescent material, the photons from the incandescence (which can have wavelengths between 0.8 and 6 microns, or other wavelengths) can provide heating similar to the heating described above with regard to the semiconductor light sources, and the incandescent material can also heat the air around it.

Accordingly, the incandescent searing system 750 can optionally include one or more airflow devices 770 (such as one or more fans or other suitable sources of airflow) to direct air past the incandescent light sources 755 to heat the air before it reaches the surface of the food 110 to heat (sear) the surface. The walls 765 can include perforations 775 that can form air jets to help direct the airflow. The heated incandescent materials (e.g., incandescent light sources 755) can deliver enough radiant flux to sear the meat in one to three minutes (the required flux is typically 5 to 25 watts per square centimeter). The perforations 775 can reduce the deposition of oil and debris ejected from the searing meat surface onto the walls 765. The incandescent searing system 750 can include aspects of other systems disclosed herein, such as controllers, and it can optionally be implemented in conjunction with, the electrical conduction cooking system 135, and/or with other aspects.

In an example implementation, meat is seared by two vertically oriented arrays of quartz tungsten-halogen lamps, totaling 4800 watts, facing opposing sides of a vertical cooking chamber with glass-ceramic windows perforated by a grid of 0.06-inch holes spaced 0.25 inches apart. Air blown past the lamps and through the holes into the chamber adds convective heating and reduces splattering of oil and residue onto the glass-ceramic.

B. SYSTEMS AND METHODS FOR HEATING OTHER MATERIALS

Aspects of embodiments of the present technology that heat materials using bulk photon sources (e.g., semiconductor light sources such as LEDs or laser diodes) are applicable to materials other than food. The photon cooking system 605 described above with regard to FIGS. 6 and 7 can be implemented to heat any suitable material (i.e., replacing the food 110 with another material) to a selected temperature. Embodiments of the present technology can heat materials for various non-food processes, such as curing finishes or coatings, curing thermally-activated adhesives, laminating and/or curing composite materials, gluing veneers, thermally darkening wood, soldering (described in additional detail in the Section C below), and/or other processes.

Figure 8:
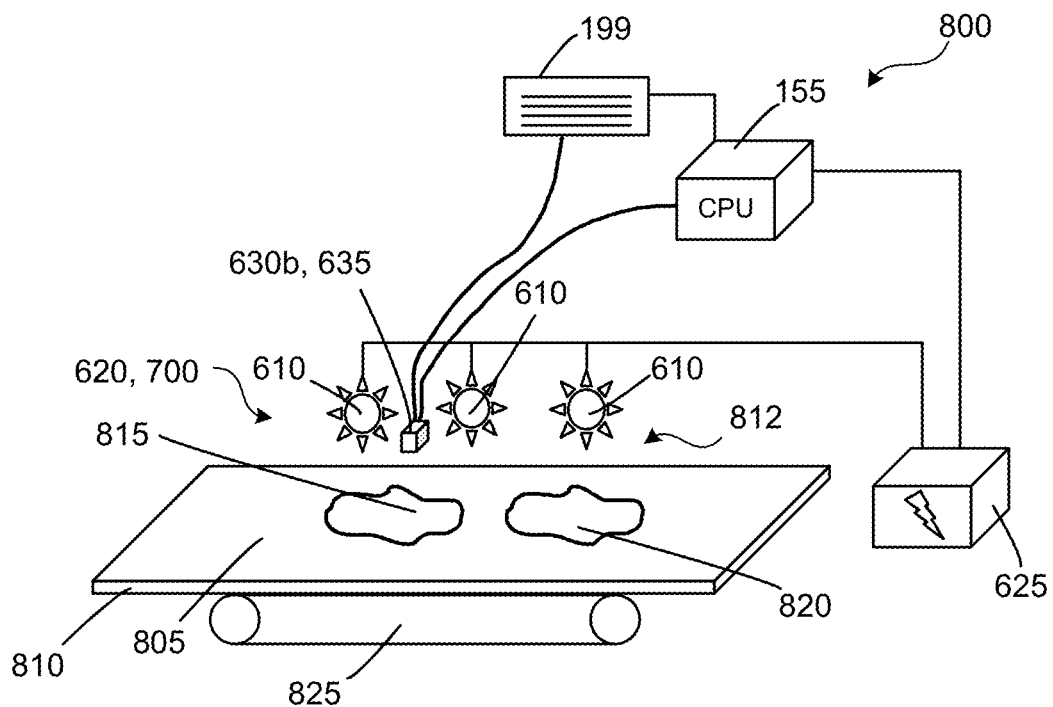
FIG. 8 illustrates a partially schematic view of a surface heating system configured in accordance with embodiments of the present technology.

FIG. 8 illustrates a partially schematic view of a heating system 800 configured in accordance with further embodiments of the present technology. The heating system 800 is configured to heat a surface 805 of a material 810 and/or one or more substances 815, 820 associated with the surface 805 (e.g., positioned on the surface 805). Heating the surface 805 and/or one or more of the substances 815, 820 can cure, activate, or otherwise change characteristics of these materials. The surface heating system 800 emits light that is absorbed by the surface 805 and/or the materials 810, 815 and converted to thermal energy that results in heating.

The heating system 800 can include several aspects of the photon cooking system 605 described above with regard to FIGS. 6 and 7. For example, the heating system 800 can include a plurality of bulk photon sources 610 (such as semiconductor light sources). The bulk photon sources 610 can be arranged in one or more of the arrays 620, 700 described above (see FIGS. 6 and 7) to illuminate a heating zone 812 where the material for heating is to be positioned. The system 800 can include the power supply 625 and the controller 155 described above. The system 800 can also include one or more sensors, such as the non-contact temperature sensor 630$b$ and/or the absorption spectrum sensor 635, each of which is connected to the controller 155. In some embodiments, the absorption spectrum sensor 635 is in the form of a reflectance spectrometer. The heating system 800 can further include a user interface, such as the user interface 199 described above, for receiving user input and/or for providing output to a user.

Accordingly, in some embodiments, the surface heating system 800 can function to heat/cook the surface of food or any other suitable material in a similar manner as the photon cooking system 605. The controller 155 can monitor the temperature of the surface 805 and/or one or more of the substances 815, 820 with a temperature signal from one or more of the sensors 630$b$, 635 and, in response to the temperature signal, the controller 155 can modulate the intensity of the output of the bulk photon sources 610 (the semiconductor light sources). Optionally, the controller 155 can modulate the intensity of the output based on a time parameter associated with the desired result of the heating process. Accordingly, the controller 155 can be programmed with instructions that, when executed, perform closed-loop temperature control of the surface and/or the substances 805, 815, 820 to achieve the appropriate time-temperature profile of the material to be heated/cured/cooked.

In example embodiments, the semiconductor light sources emit photons with wavelengths less than 700 nanometers, although other embodiments can include other wavelengths depending on the absorptive characteristics of the surface 805 and/or the substances 815, 820 to be heated. Common transparent materials such as glass-ceramic or borosilicate glass do not absorb significantly at these shorter wavelengths. Advantageously, this helps avoid heating windows and other components, which prevents them from re-radiating unwanted heat back into the system.

In some embodiments, an array 620, 700 includes semiconductor light sources that have a variety of wavelength outputs. For example, one or more first semiconductor light sources in an array 620, 700 can have a first wavelength output and one or more second semiconductor light sources in the array 620, 700 can have a second wavelength output that is different from the first wavelength output. The controller 115 can modulate the first and second semiconductor light sources independently or together depending on the appropriate overall output of the array 620, 700 for the materials. The semiconductor light sources in the arrays 620, 700 can be arranged in subgroups 705 (see FIG. 7 and the corresponding description above).

For example, the controller 115 can increase the intensity of the first semiconductor light sources (first subgroup) if the first wavelength output corresponds with the absorption spectrum of the surface to be heated, or it can increase the intensity of the second semiconductor light sources (second subgroup) if the second wavelength output matches the absorption spectrum of the surface to be heated. The controller 155 can modulate the subgroups together or independently. Generally, the controller 155 controls the semiconductor light sources or subgroups of the semiconductor light sources (e.g., subgroups 705) based on the absorption and/or reflection spectra of portions of the surface 805 and/or the substances 815, 820 (as detected by the absorption spectrum sensor 635, for example). Such individual control can enable different levels of heating, uniform levels of heating, or intentionally non-uniform levels of heating.

In some embodiments, the controller 155 can cause the absorption spectrum sensor 635 to measure the absorption spectrum a plurality of times to dynamically adjust the output of the bulk photon sources 610 during a heating process. In further embodiments, absorption spectrum information may be input into the controller 155 from an external database containing such information for various materials, measured by a user and input into the controller 155, or visually estimated by a user and input into the controller 155 (for example, via the user interface 199 or a communications interface connected to the controller 155). In some embodiments, the memory 196 associated with the controller 155 can include a database of absorption characteristics for various materials. A user can input the material into the user interface 199 and the controller 155 can heat the material based on the information from the memory 196.

Optionally, the system 800 and/or an operator can apply an optically absorptive material to the surface to preferentially absorb output from the bulk photon sources 610. The material can be selectively applied to areas that benefit from elevated temperature. Conversely, areas without the optically absorptive material may be heated to a lesser degree or not heated at all because they will not necessarily absorb the output from the bulk photon sources 610. Accordingly, the heating can be targeted to desired areas. In further examples, a method can include applying multiple optically absorptive materials of different levels and wavelengths of optical absorptivity to result in different levels of energy absorption and therefore different heating characteristics. Optically absorptive materials can include nigrosine dye, red iron oxide pigment, or other additives with optically absorptive properties.

In an example implementation, nigrosine dye is incorporated into a powdered thermoplastic coating material which is applied to a surface and then subjected to irradiation from a 2200-watt array of phosphor-converted LEDs emitting white light, melting the powdered coating and fusing it to the surface. In another example use, red iron oxide pigment is incorporated into the epoxy matrix of an epoxy-fiberglass composite, which is then irradiated with 1200 watts of blue LEDs, the wavelength of which is preferentially absorbed by the iron oxide pigment, heating the epoxy to its required post-curing temperature. The technology includes other implementations, and these examples are not limiting of the technology.

In some embodiments, the surface heating system 800 can include a conveyor mechanism 825, such as a conveyor belt or another mechanism for moving the material 810 relative to the heating zone 812. Such a mechanism may be useful in commercial and/or industrial applications in which the heating process is performed on several parts in series, such as in a factory environment.

Advantages of embodiments of the surface heating system include that the wavelength of the bulk photon source 610 emitters can be matched to the absorption spectrum of the surface to optimize absorption, which is not achievable with blackbody radiative heating used in conventional heating/curing processes. For moving-target applications, as on a conveyer mechanism 825, modulation of the arrays 620, 700 in subgroups or by individual emitters, with feedback from one or more sensors 630b (such as one or more thermal cameras and/or an array of non-contact infrared temperature sensors) observing the heating zone 812, can provide more uniform temperature than conventional heating methods, and/or it can provide intentionally non-uniform heating in controlled patterns that are not achievable with conventional heating methods.

Although some embodiments digitally control the bulk photon sources 610, in some embodiments, the controller 155 can include analog and/or manual control devices. The manual and/or analog control devices can be configured to vary the intensity and/or the duration of activation of the bulk photon sources 610 to control heating of the materials. In some embodiments, the temperature sensor 630b can be connected to the user interface 199 (e.g., via the controller 155 or directly) to display temperature information about the material in the heating zone 812.

C. SYSTEMS AND METHODS FOR SOLDERING (SUCH AS REFLOW SOLDERING)

Figure 9:
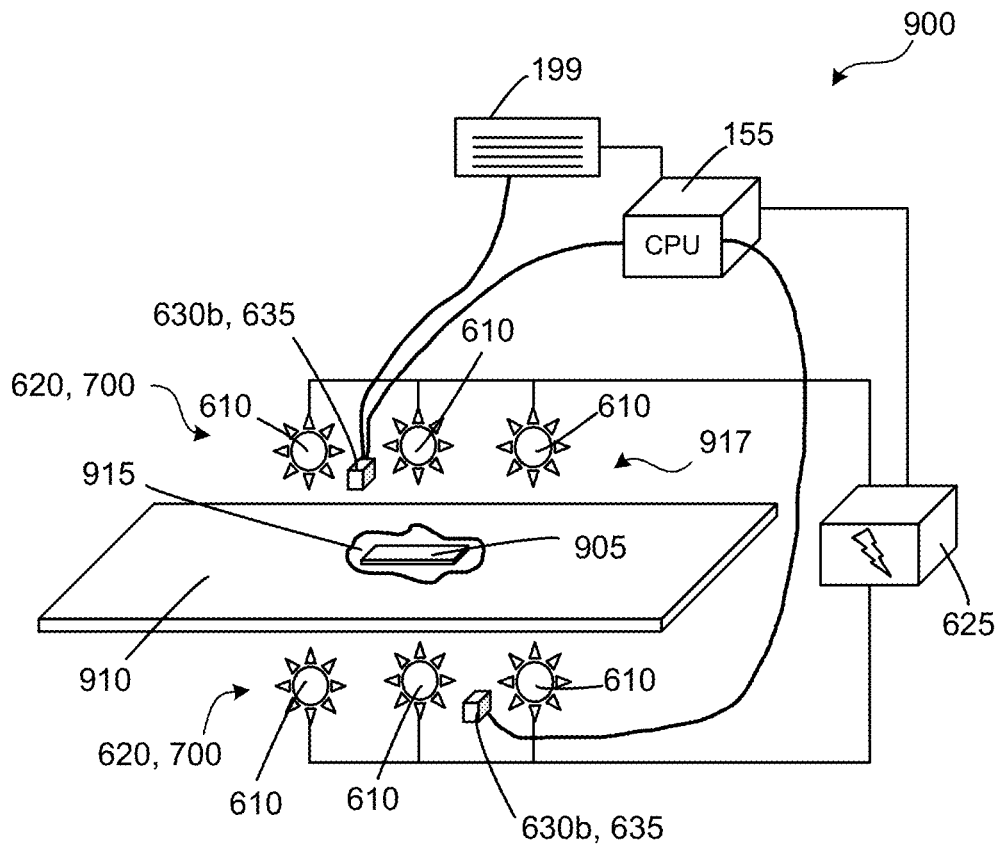
FIG. 9 illustrates a partially schematic view of a soldering system configured in accordance with embodiments of the present technology.

FIG. 9 illustrates a partially schematic view of a soldering system 900 for performing soldering, configured in accordance with embodiments of the present technology. The soldering system 900 can be generally similar to the surface heating system 800 and the photon cooking system 605 described above, except that the material to be heated includes solder or other elements of a printed circuit board (PCB). For example, the soldering system 900 can include bulk photon sources 610 arranged in arrays 620, 700, powered by the power source 625, and controlled (modulated) by the controller 155 with or without feedback from the sensors 630b, 635. The soldering system 900 can perform reflow soldering to affix one or more components 905 to a printed circuit board (PCB) 910 with solder paste 915. The one or more components 905 can include typical electronic components suitable for use in a PCB assembly, such as resistors, transistors, capacitors, integrated circuits, chips, or other components.

Arrays 620, 700 of bulk photon sources 610 (semiconductor light sources) and sensors 630b, 635 are positioned above and/or below a heating zone 917. The PCB 910 is positioned in the heating zone 917 to receive emissions from the bulk photon sources 610. Using closed-loop temperature sensing of the PCB 910 (similar to the closed-loop processes described above for cooking food 110 and/or heating a surface 805), a component 905 is soldered to the PCB 910 with more precision and efficiency than conventional reflow soldering methods. For example, the controller 155 receives temperature information from the sensors 630b, 635 and, in response to the temperature information, modulates the intensity of the bulk photon sources 610 to control the temperature of one or more portions of the PCB 910 to melt the solder without thermal damage to the PCB 910 or the component 905. In some embodiments, the controller 155 modulates the intensity of the bulk photon sources 610 based in part on a time factor associated with the soldering process, such that the controller 155 performs closed-loop temperature control to produce a time-temperature sequence.

Similar to the surface heating system 800 and the photon cooking system 605 described above, each array 620, 700 can include bulk photon sources 610 (e.g., semiconductor light sources) that have a variety of wavelength outputs. The controller 155 can modulate the semiconductor light sources independently or in groups (e.g., subgroups 705) depending on the appropriate intensity for the portion of the PCB 910 exposed to the output of the semiconductor light sources. The controller 155 modulates the semiconductor light sources or groups of semiconductor light sources (e.g., subgroups 705) based on the absorption and/or reflection spectra of portions of the PCB 910 and/or the solder paste 915 (as detected by the absorption spectrum sensor 635, for example). Such individual control can enable different levels of heating, uniform levels of heating, or intentionally non-uniform levels of heating.

In some embodiments, one or more of the bulk photon sources 610 (e.g., the semiconductor light sources) are configured to emit wavelengths that match the absorption spectrum of the solder paste 915 or other parts of the PCB 910. In some embodiments, a dye or absorbent material is added to the solder paste 915 to improve the energy absorption of the solder paste 915. Examples of suitable absorbent materials include lampblack, cerium sesquisulfide, or other materials with absorption spectra corresponding to the emission wavelengths of the bulk photon sources 610. In some embodiments, the bulk photon sources 610 are configured to emit wavelengths that are reflected by the surface of the PCB 910 and/or by a solder mask or other coatings positioned on the PCB 910, which reduces heating in areas where heating is not desired. Absorbent material (having an absorption spectrum corresponding to the bulk photon sources 610) and/or reflective material (having a reflection spectrum corresponding to the bulk photon sources 610) can be applied in various portions of the PCB 910 to specifically heat or protect areas of the PCB 910.

Accordingly, embodiments of the present technology can limit the application of energy from the bulk photon sources 610 to the solder paste 915 itself rather than generally heating the entire PCB 910 and/or the component 905. As a result, reflow soldering processes according to embodiments of the present technology reduce the risk of damaging sensitive components 905 or the PCB 910 itself during a reflow soldering process.

In some embodiments, the system 900 can include one or more temperature sensors 630b, each directed at different locations in the heating zone 917. The bulk photon sources 610 (such as subgroups 705, see FIG. 7) are directed at corresponding locations in the heating zone 917. The controller 155 adjusts the individual bulk photon sources 610 or subgroups 705 to control heating of the various locations in the heating zone 917 to achieve uniformity of heating or intentional non-uniformity of heating. For example, a first location in the heating zone 917 can include solder paste 915, while a second location different from the first location may also include solder paste 915. The controller 155 adjusts the intensity of the bulk photon sources 610 adjacent to the first and second locations based on information from the temperature sensors 630b to result in consistent temperatures at both locations. Conversely, if the second location does not include solder paste, the controller 155 can reduce the intensity of the bulk photon sources 610 adjacent to the second location to avoid heating the second location. For example, if the second location includes electrolytic capacitors, connectors, or other objects which do not benefit from as much heating as the solder, the controller 155 can reduce the intensity of the bulk photon sources 610 adjacent to those elements to avoid heating them.

In an example operation, the controller 155 adjusts the subgroups 705 of bulk photon sources 610 to achieve a time-temperature-location sequence across the surface of the PCB 910. For example, the controller 155 first modulates the bulk photon sources 610 to uniformly heat the entire PCB 910 to an intermediate preheat temperature that may be slightly cooler than the melting point of the solder in the solder paste 915. Then the controller 155 can heat some or all of the PCB 910 assembly to melt the solder in the solder paste 915. In one example, the controller 155 can operate the subgroups 705 in a sequence across the array 620, 700 to cause a wave of elevated temperature above the melting point of the solder 915, such that the heating and subsequent cooling of the solder in the solder paste 915 happens progressively along the PCB 910. In another example operation, the controller 155 can operate the subgroups 705 to emit selected wavelengths that are preferentially absorbed or reflected by the various portions of the PCB 910.

In another example embodiment, the PCB 910 may have a blue solder mask coating (thus preferentially absorbing red light, and reflecting blue light) while the solder paste 915 may incorporate a red pigment (thus preferentially absorbing blue light while reflecting red light). The bulk photon sources 610 may include some red emitters and some blue emitters (e.g., subgroups 705 of red and blue). The PCB 910 may be brought to an intermediate preheat temperature by modulation of the red emitting subgroup of bulk photon sources 610, which results in the blue solder mask absorbing energy to heat the PCB 910. Then the system can modulate the blue emitting subgroup of bulk photon sources 610 to heat the red-pigmented solder paste 915 to melt it. The blue coating on the PCB 910 reflects the blue light while the solder paste 915 is melted, to resist (e.g., prevent) the PCB 910 from overheating.

In another example embodiment, the inventor directed an array configured to produce approximately 720 watts of blue LED light at approximately 450 nanometers toward a PCB assembly containing surface mount parts including semiconductors and passive elements. The surface mount parts were positioned on the PCB and attached with solder paste 915, but the solder had not yet been melted. Then the inventor activated one subgroup of the array producing approximately 60 watts of optical flux, the subgroup containing 100 individual semiconductor light sources. The subgroup melted and reflowed the solder, thereby attaching the surface mount parts to the PCB. The inventor used a thermocouple junction in contact with the PCB surface for temperature feedback to modulate the LED intensity by proportional-integral-derivative control. A glass-ceramic window supported the PCB above the LED array.

In another example embodiment, the inventor used a modulated 2200 watt array of phosphor-converted blue LEDs emitting white light at 4500K to reflow solder in a PCB assembly. The inventor used an infrared temperature sensor to monitor the temperature of the printed circuit board assembly while heating.

D. ADDITIONAL EXAMPLES

Several additional aspects and/or embodiments of the present technology are set forth in the following examples:

1. A system for heating material (such as food or solder or another material) via absorption of light, comprising:
    an array of multiple semiconductor light sources, the array producing wavelengths of light in the visible, near-infrared, and/or short-infrared spectrum which are favorably absorbed by the material, the array positioned facing a heating zone where the material is located, such that the distance from the array to the heating zone, in relation to the spacing between light sources within the array and the divergence angles of light emitted from each light source, causes the illumination from adjacent light sources in the array to overlap within the heating zone;
    a power supply providing electric current to the semiconductor light source array; wherein
    the power supply includes a controller allowing modulation (e.g., increase, reduction and/or termination) of the light output of the array.

2. The system of example 1, wherein the semiconductor light sources are laser diodes, the wavelengths optionally include wavelengths between 390 nanometers (nm) and 590 nm, and the array optionally positions the individual laser diodes such that their fast-axis and slow-axis divergences causes the light from adjacent laser diodes to overlap in both axes within the heating zone.

3. The system of example 1, wherein the semiconductor light sources are light-emitting diodes, the wavelengths optionally include wavelengths between 390 nm and 700 nm.

4. The system of example 1, wherein the semiconductor light sources are light-emitting diode chips mounted in one or more chip-on-board arrays each providing mechanical support, shared electrical power connections, and heat removal for the chips, and the chip-on-board arrays are attached to the thermal management substrate.

5. The system of example 1, wherein the semiconductor light sources include a phosphor for wavelength conversion, the phosphor optionally producing wavelengths in the visible spectrum including between 390 nm and 700 nm and/or optionally in the short-infrared spectrum including between 700 nm and 2500 nm.

6. The system of any one of examples 1-5, wherein the array contains more than 4 individual semiconductor light sources arranged across an area of more than 4 square inches and the heating (cooking) zone exceeds 16 square inches and exceeds 2 inches in its narrowest dimension.

7. The system of any one of examples 1-6, further comprising one or more optically transmissive elements separating the array from the material, wherein the optically transmissive elements include separate beam-shaping lenses for each semiconductor light source in the array and also include a cleanable transparent barrier surface exposed to the material, the barrier comprising soda-lime glass, borosilicate glass, fused quartz, sapphire, and/or transparent glass-ceramic.

8. The system of any one of examples 1-7, further comprising a cooled thermal management substrate behind the array to remove waste heat; wherein the cooled thermal management substrate comprises a water-cooled plate, a heatsink cooled by airflow, a plate cooled by heat pipes, an actively refrigerated plate cooled by phase change, and/or an actively refrigerated plate cooled by the thermoelectric effect.

9. The system of any one of examples 1-8, wherein the power supply includes a constant-current driver with adjustable power output and on-off control.

10. The system of any one of examples 1-9, wherein the output power of the power supply is controlled via a closed-loop temperature control device, wherein the closed-loop temperature control device measures the surface temperature of the material and uses this temperature measurement to govern the output of the semiconductor light sources via a hysteretic, proportional, proportional-differential, and/or proportional-integral-differential relationship.

11. The system of any one of examples 1-10, wherein the semiconductor light sources include multiple different wavelength emitters arranged within the array to provide illumination across the cooking zone by different wavelengths and wherein the power supply separately controls power delivery to different wavelength emitters, thus varying the spectral intensity distribution of illumination within the heating zone.

12. The system of any one of examples 1-11, wherein the array optionally delivers at least 5 watts per square inch of optical flux at its aperture and 1 watt per square inch within the heating zone.

13. A method of cooking a piece of food (e.g., meat), comprising the steps of:
    adding thermal energy to the meat at a controlled rate via electrical conductive heating by passage of alternating or direct current through the meat with at least one variable power source connected to the meat with at least two electrodes;
    varying the rate of electrical energy transfer into the meat by modulation of the power source via a closed-loop control algorithm utilizing at least one input parameter, wherein the at least one input parameter comprises: meat internal temperature, meat surface temperature, meat electrical impedance, meat dielectric constant, meat dielectric loss, a rate of energy delivery from the power supply, and/or a rate of current flow through the meat;
    modulating the variable power source, using the control algorithm, to achieve a target internal temperature in the meat;
    searing the meat by adding thermal energy to the surface of the meat at a controlled rate to achieve a desired change in surface color and texture, wherein searing the meat comprises using photons (for example, photons having wavelengths between 400 nm and 14 microns), impingement of hot air, and/or contact with hot oil;

varying the rate of thermal energy transfer during searing with a closed-loop algorithm based on at least time, meat temperature, meat electrical impedance, meat dielectric constant, meat dielectric loss, meat optical reflectivity, meat hardness, and/or meat optical reflection spectrum;

achieving the target internal temperature in the meat and/or the desired change in surface color and texture within a specified time, wherein achieving the target internal temperature in the meat and/or the desired change in surface color and texture are achieved at the same time or at a different time.

14. The method of example 13, wherein varying the rate of electrical energy transfer into the meat occurs before, during, or after searing the meat.

15. The method of example 13 or 14, wherein searing the meat comprises searing the meat using photons produced by semiconductor light sources and/or the system of any one of examples 1-12.

16. The method of any one of examples 13-15, wherein searing the meat comprises searing the meat by submerging the meat in oil or by splashing, spraying, flowing, or otherwise agitating the oil onto the meat without submerging the meat in the oil.

17. The method of any one of examples 13-16, wherein the electrical conduction heating is performed using multiple independently controlled electrical energy sources (power supplies), each heating different physical areas of the meat to achieve consistent thermal energy distribution throughout the volume of the meat.

18. The method of example 17, wherein the multiple independently controlled electrical energy sources are each separately controlled via closed-loop feedback using temperature measurements from physically separate locations within the meat, to achieve consistent thermal energy distribution throughout the volume of the meat.

19. The method of example 17, wherein the multiple independently controlled electrical energy sources are each separately controlled via closed-loop feedback using changes in the electrical impedance of the meat to infer differences in heating between different physical areas of the meat, to achieve consistent thermal energy deposition throughout the volume of the meat.

20. The method of example 17, wherein the multiple independently controlled electrical energy sources operate using closed-loop current feedback to stabilize or reduce the rate of energy delivery to areas of the meat as electrical impedance of the meat within that area decreases.

21. The method of any one of examples 13-20, wherein controlling the energy transfer into the meat is based at least in part on the total energy required to reach the target internal temperature, wherein the total energy is determined based on the specific heat capacity of the meat and/or the mass of the meat.

22. The method of example 21, further comprising determining the heat capacity of the meat based at least in part on the rate of change of temperature of the meat.

23. The method of any one of examples 13-22, wherein the power of the electrical conduction heating is changed stepwise during the cooking process, and the measured perturbation in rate of change of the measured internal temperature of the meat resulting from this step-change in applied power is used to calculate or predict the peak internal temperature which would result if the cooking process were ended at that time.

24. A method of soldering printed circuit boards, comprising the steps of:

exposing a printed circuit board assembly to light from one or more arrays of semiconductor light sources (i.e. illuminating the printed circuit board assembly with the semiconductor light sources), wherein the printed circuit board assembly comprises components and solder paste placed on the board prior to melting and reheating the solder in the solder paste, wherein the semiconductor light sources comprise light-emitting diodes and/or laser diodes, wherein exposing the printed circuit board assembly to the light heats the printed circuit board assembly by absorption of photons emitted by the semiconductor light sources;

measuring the temperature of the printed circuit board assembly; and modulating the intensity of the semiconductor light sources based at least in part on a temperature of the printed circuit board assembly and a time of exposure;

wherein modulating the intensity of the semiconductor light sources comprises using closed-loop temperature control of the printed circuit board assembly to melt the solder in the solder paste without overheating the printed circuit board assembly.

25. The method of example 24, comprising measuring the temperature of the printed circuit board assembly using one or more infrared optical non-contact temperature sensors and/or a thermal camera which collects temperature data at multiple locations by imaging the printed circuit board assembly in the infrared spectrum.

26. The method of example 24 or 25, further comprising applying an optically absorptive material to one or more portions of the printed circuit board assembly, the optically absorptive material being configured to absorb a wavelength or spectrum of wavelengths of light (photons) emitted from the semiconductor light sources, wherein applying the optically absorptive material comprises applying the material selectively to areas of the printed circuit board assembly intended to be heated.

27. The method of example 26, wherein the one or more portions of the printed circuit board assembly comprises the solder paste.

28. The method of example 26, comprising applying different optically absorptive materials to different portions of the printed circuit board assembly to achieve different levels of heating on the printed circuit board assembly.

29. The method of any one of examples 24-28, comprising applying a solder mask or other surface coating on one or more first portions of the printed circuit board assembly, wherein the solder mask or other surface coating has lower absorptivity at the wavelengths emitted by the semiconductor light sources than second portions of the printed circuit board assembly, to achieve reduced heating in the first portions.

30. The method of any one of examples 24-29, wherein one or more of the arrays comprises multiple semiconductor light sources configured to output multiple different wavelengths, and wherein modulating the intensity of the semiconductor light sources comprises:

modulating the intensity of a first semiconductor light source of the semiconductor light sources differently than a second semiconductor light source of the semiconductor light sources, wherein the first semiconductor light source has a first output wavelength that is different from a second output wavelength of the second semiconductor light source, wherein the first output wavelength correlates to a first portion of the printed circuit board assembly and the second output wavelength correlates to a second portion of the printed circuit board assembly that is different from the first portion, such that the first portion of the printed circuit board assembly is heated differently than the second portion of the printed circuit board assembly.

31. The method of any one of examples 24-30, comprising modulating the semiconductor light sources within each array in physically distinct subgroups smaller than an entire array.

32. The method of example 31, wherein the physically distinct subgroups are individual semiconductor light sources or smaller arrays of multiple semiconductor light sources.

33. The method of example 31, comprising:
modulating the intensity of the subgroups
raising the temperature of the printed circuit board assembly to an intermediate temperature above ambient but below a melting point of the solder,
raising temperatures of portions of the printed circuit board assembly above the melting point of the solder in a sequence, wherein the sequence comprises raising the temperatures from one side of the printed circuit board assembly to the other, such that melting and subsequent re-solidification of the solder is achieved progressively across the surface of the printed circuit board assembly.

34. A method of heating a surface, comprising the steps of:
exposing the surface to light from one or more semiconductor light sources (i.e. illuminating the surface with the semiconductor light sources), wherein the semiconductor light sources comprise light-emitting diodes and/or laser diodes, wherein exposing the surface to the light heats the surface by absorption of photons from the semiconductor light sources;
measuring the temperature of the surface; and
modulating the intensity of the semiconductor light sources based at least in part on a temperature of the surface and a time of exposure;
wherein modulating the intensity of the semiconductor light sources comprises using closed-loop temperature control of the surface.

35. The method of example 34, comprising measuring the temperature of the surface using one or more infrared optical non-contact temperature sensors and/or a thermal camera which collects temperature data at multiple locations by imaging the surface assembly in the infrared spectrum.

36. The method of example 34 or 35, further comprising applying an optically absorptive material to one or more portions of the surface, the optically absorptive material being configured to absorb a wavelength or spectrum of wavelengths of light (photons) emitted from the semiconductor light sources, wherein applying the optically absorptive material comprises applying the material selectively to areas of the surface intended to be heated.

37. The method of example 36, comprising applying different optically absorptive materials to different portions of the printed circuit board assembly to achieve different levels of heating on the surface.

38. The method of any one of examples 34-37, wherein the semiconductor light sources are arranged in one or more arrays, wherein one or more of the arrays comprises multiple semiconductor light sources configured to output multiple different wavelengths, and wherein modulating the intensity of the semiconductor light sources comprises:
modulating the intensity of a first semiconductor light source of the semiconductor light sources differently than a second semiconductor light source of the semiconductor light sources, wherein the first semiconductor light source has a first output wavelength that is different from a second output wavelength of the second semiconductor light source;
wherein the first output wavelength correlates to a first portion of the surface and the second output wavelength correlates to a second portion of the surface that is different from the first portion, such that the first portion of the surface is heated differently than the second portion of the surface.

39. The method of any one of examples 34-38, wherein the semiconductor light sources are arranged in one or more arrays, and the method comprises modulating the semiconductor light sources within each array in physically distinct subgroups smaller than an entire array, to achieve uniform or nonuniform temperature distribution along the surface.

40. The method of example 39, wherein the physically distinct subgroups are individual semiconductor light sources or smaller arrays of multiple semiconductor light sources.

41. The method of example 39 or 40, wherein closed-loop control is used to modulate the distinct subgroups to achieve a desired time-temperature-location sequence across the surface.

42. The method of any one of examples 34-41, comprising moving the surface relative to the semiconductor light sources while modulating the intensity of the semiconductor light sources.

43. A system comprising the components in any one of examples 13-42, for performing the method in any one of examples 13-42.

44. A system for cooking food, the system comprising:
an electrical conduction cooking system, the electrical conduction cooking system including a plurality of electrodes and a power supply connected to the electrodes, wherein the electrodes are configured to connect the electrical conduction cooking system to the food to input electrical energy into the food by passing electric current through the food, wherein the electrical energy converts to thermal energy in the food to heat the food;
a searing system for searing an external surface of the food;
a temperature sensor positioned to receive temperature information about the food; and
a controller programmed with instructions that, when executed, receive the temperature information and perform closed-loop feedback control of the electrical conduction cooking system and/or the searing system to regulate a temperature of the food.

45. The system of example 44, wherein:
the temperature sensor is positioned to receive temperature information about the external surface of the food; and
the temperature of the food is a temperature of the external surface of the food.

46. The system of example 44 or 45, wherein the power supply is configured to provide variable regulated constant-current or constant-power output to the electrodes.

47. The system of any one of examples 44-46, wherein:
the controller comprises one or more controllers;
at least one of the one or more controllers is programmed with instructions that, when executed, receive electrical characteristic information about an electrical characteristic of the food from the power supply and perform closed-loop feedback control of the electrical conduction cooking system to modulate the electrical energy in response to the electrical characteristic information; and the power supply is configured to sense the electrical characteristic information, and the electrical characteristic information includes at least one of electrical impedance, electrical resistance, electrical reactance, electrical capacitance, dielectric constant, or dielectric loss.

48. The system of any one of examples 44-47, wherein the searing system comprises a hot oil cooking system configured to distribute hot oil on the external surface of the food.

49. The system of example 48, wherein the hot oil cooking system comprises:
an oil reservoir;
an air pump;
a heater connected to the air pump; and
one or more air passageways connected to the heater and the air pump, the air passageways positioned to pass air into the oil reservoir to distribute the hot oil on the external surface of the food.

50. The system of example 48 or 49, further comprising:
an enclosure; and
an enclosure heating system for heating the enclosure;
wherein the enclosure heating system comprises an induction heating coil or a resistance heating element.

51. The system of any one of examples 44-50, wherein:
the power supply is a first power supply;
the searing system comprises a plurality of semiconductor light sources and a second power supply connected to the semiconductor light sources; and
the controller is further programmed with instructions that, when executed, modulate an output intensity of the semiconductor light sources.

52. The system of example 51, further comprising an absorption spectrum sensor for determining absorption spectrum characteristics of the food, wherein the controller is further programmed with instructions that, when executed, modulate the output intensity of the semiconductor light sources in response to the absorption spectrum characteristics.

53. The system of any one of examples 44-52, wherein the searing system comprises:
a plurality of incandescent light sources;
one or more perforated transparent walls positioned between a cooking zone and the incandescent light sources; and
an airflow device positioned to direct air past the incandescent light sources to heat the air, and through the perforated transparent walls, into the cooking zone.

54. A method for cooking food, the method comprising:
inputting electrical energy into the food by passing electric current through the food, wherein the electrical energy converts to thermal energy in the food to heat the food;
sensing a characteristic of the food, wherein the characteristic includes an internal temperature of the food and/or an electrical characteristic of the food; and
modulating the electric current in response to the characteristic of the food to achieve a selected internal temperature of the food.

55. The method of example 54, further comprising searing a surface of the food using hot oil, hot air, or photons, wherein:
searing the surface comprises searing the surface while passing electric current through the food; or searing the surface comprises searing the surface after passing electric current through the food and the method is performed within a single appliance.

56. The method of example 54 or 55, wherein the selected internal temperature is an intermediate internal temperature, the method further comprising:
searing a surface of the food using hot oil, hot air, or photons until the internal temperature reaches a target internal temperature that is higher than the intermediate internal temperature; and
determining, using a controller, the intermediate internal temperature based on a heat capacity of the food and the target internal temperature.

57. The method of example 54, further comprising searing the food with hot oil, wherein searing the food with hot oil comprises distributing the hot oil within a cooking zone by splashing or spraying the hot oil within the cooking zone.

58. The method of example 57, further comprising modulating a temperature of the hot oil using closed-loop feedback control with input from a temperature sensor in contact with the hot oil.

59. The method of example 54, further comprising searing the food by directing photons at the surface of the food using a plurality of semiconductor light sources, wherein a wavelength of the photons matches an absorption wavelength of the food.

60. The method of example 59, further comprising modulating an output intensity of the semiconductor light sources in response to a temperature of the food.

61. The method of example 60, wherein modulating the output intensity of the semiconductor light sources comprises modulating a first subgroup of the semiconductor light sources differently than a second subgroup of the semiconductor light sources.

62. A system for heating a material, the system comprising:
a plurality of semiconductor light sources positioned to emit photons toward a heating zone;
a power supply connected to the semiconductor light sources;
a controller connected to the power supply to modulate one or more of the semiconductor light sources to heat the material using light emitted from the semiconductor light sources; and
a temperature sensor configured to sense a temperature of the material, wherein the temperature sensor is connected to the controller and/or to a user interface configured to output the temperature of the material.

63. The system of example 62, wherein the controller is a digital controller, and the controller is programmed with instructions that, when executed, modulate one or more of the semiconductor light sources to heat the material using light emitted from the semiconductor light sources.

64. The system of example 63, wherein the temperature sensor is connected to the controller, and wherein the controller is programmed with instructions that, when executed, perform closed-loop control of the temperature of the material.

65. The system of any one of examples 62-64, wherein a first subgroup of the semiconductor light sources is configured to be modulated differently than a second subgroup of the semiconductor light sources.

66. The system of example 65, wherein the controller is a digital controller, the system further comprising one or more sensors positioned to observe the material to determine a thermal profile of the material, and wherein the controller is programmed with instructions that, when executed, modulate the first subgroup differently than the second subgroup in response to the thermal profile of the material.

67. The system of example 65 or 66, wherein:
the system further comprises an absorption spectrum sensor positioned to collect absorption spectrum information for the material;
the controller is a digital controller;
the first subgroup emits a first wavelength of light;
the second subgroup emits a second wavelength of light different from the first wavelength of light; and
the controller is programmed with instructions that, when executed, modulate the first subgroup differently than the second subgroup in response to the absorption spectrum information.

68. A method for heating a material, the method comprising:
modulating a plurality of semiconductor light sources to emit an incoherent field of diffuse light onto the material to heat the material;
wherein modulating the plurality of semiconductor light sources comprises varying an intensity of the semiconductor light sources and/or a duration of the semiconductor light sources to heat the material to a selected temperature.

69. The method of example 68, further comprising:
measuring, using one or more sensors, a temperature of the material;
wherein modulating the plurality of semiconductor light sources comprises modulating using closed-loop control with the temperature of the material as an input to the closed-loop control.

70. The method of example 69, wherein:
measuring the temperature of the material comprises measuring using a thermal camera or a plurality of non-contact temperature sensors to determine a thermal profile of the material comprising temperature data for multiple locations on the material; and
modulating the plurality of semiconductor light sources comprises modulating a first subgroup of the plurality of semiconductor light sources differently than a second subgroup of the plurality of semiconductor light sources in response to the thermal profile, where each subgroup includes one or more, but not all, of the semiconductor light sources.

71. The method of any one of examples 68-70, wherein the plurality of semiconductor light sources comprises a first subgroup of semiconductor light sources configured to emit a first wavelength of photons and a second subgroup of semiconductor light sources configured to emit a second wavelength of photons that is different from the first wavelength, the method further comprising:
if a portion of the material absorbs light at the first wavelength, modulating the first subgroup to emit at a first intensity level and modulating the second subgroup to emit at a second intensity level that is different from the first intensity level.

72. The method of any one of examples 68-71, further comprising:
applying an optically absorptive material to one or more portions of the material, the optically absorptive material being configured to absorb a wavelength of light emitted from one or more of the plurality of semiconductor light sources; or
applying an optically reflective material to one or more portions of the material, the optically reflective material being configured to reflect a wavelength of light emitted from one or more of the plurality of semiconductor light sources.

73. The method of any one of examples 68-72, wherein the material comprises a circuit board and solder positioned on the circuit board, and the method further comprises:
positioning the solder on the circuit board; and
positioning a component on the solder before modulating the plurality of semiconductor light sources to emit photons toward the circuit board and the solder to melt the solder.

The foregoing examples may be combined with each other, and further examples of the present technology include more, fewer, or different elements than the elements in the examples. Although several examples include specific materials, numerical parameters, specific quantities of parts, and/or specific dimensions, such materials, parameters, quantities, and/or dimensions are non-limiting and are for example only, and further embodiments of the present technology can include larger or smaller parameters, quantities, and/or dimensions.

E. CONCLUSION

From the foregoing, it will be appreciated that specific embodiments of the disclosed technology have been described herein for purposes of illustration, but that various modifications may be made without deviating from the technology. Although specific dimensions are provided for context and/or to indicate representative embodiments, various further embodiments can have other sizes.

Many embodiments of the technology described herein can take the form of computer- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller, or other data processor or circuitry that is specifically programmed, configured, or constructed to perform one or more of the computer-executable (controller-executable) instructions described herein. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers, and the like), programmable general-purpose or special-purpose microprocessors, programmable controllers (such as programmable logic controllers), programmable logic devices (PLDs), application-specific integrated circuits (ASICs), field-programmable gate arrays (FPGAs) or the like, microcontrollers (such as embedded microcontrollers), and/or any suitable combination of such devices. Computer-executable (controller-executable) instructions and/or databases may be stored in memory, such as random access memory (RAM), read-only memory (ROM), flash memory, or the like, and/or any suitable combination of such components. Computer-executable (controller-executable) instructions and/or databases may also be stored in one or more storage devices, such as magnetic or optical-based disks, flash memory devices, and/or any other suitable type of non-volatile storage medium or non-transitory medium for data. The term "memory" as used herein (e.g., the memory 196) can include volatile and/or non-volatile memory and/or storage. Computer-executable (controller-executable) instructions may include one or more program modules, which can include routines, programs, objects, components, data structures, and so on that perform particular tasks and/or implement particular abstract data types. Information handled by these computers and controllers can be presented at any suitable display medium, including an LCD or via indicator lights or audible annunciators (for example, a display, light, or annunciator associated with the user interface 199). Components of systems disclosed herein, such as sensors, controllers, power sources, memory, user interfaces, and/or other components can be interconnected with one or more buses and/or other circuitry or components suitable for facilitating intercommunication of data, information, and/or commands among the components.

The technology can also be practiced in distributed environments, where tasks or modules are performed by remote processing devices that are linked through a communications network (e.g., a wireless communication network, a wired communication network, a cellular communication network, the Internet, and/or a short-range radio network such as Bluetooth) and/or via analog signals (such as four to twenty milliamp current loops or zero to ten volt signal lines). In a distributed computing environment, program modules and/or subroutines may be located in local and remote memory storage devices. Aspects of the technology described herein may be stored and/or distributed on computer-readable media, including magnetic or optically readable or removable computer disks, as well as distributed electronically over networks. Data structures and transmissions of data particular to aspects of the technology are also encompassed within the scope of the embodiments of the technology. The actual implementation of a database may take a variety of forms, and the term "database" is used herein in the generic sense to refer to any data structure that allows data to be stored and accessed, such as tables, linked lists, arrays, etc.

Certain aspects of the technology described in the context of particular embodiments may be combined or eliminated in other embodiments. Any steps in processes or methods described herein may optionally be omitted or performed in a different order than described herein. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

Singular or plural terms can also include the plural or singular term, respectively. As used herein, the term "and/or" when used in the phrase "A and/or B" refers to A alone, B alone, and both A and B. A similar manner of interpretation applies to the term "and/or" when used in a list of more than two terms. As used herein, the terms "generally," "about," and "approximately" refer to values or characteristics within a range of ±10% from the stated value or characteristic, unless otherwise indicated. To the extent any materials incorporated herein by reference conflict with the present disclosure, the present disclosure controls.

I claim:

1. A system for cooking food, the system comprising:
   an electrical conduction cooking system, the electrical conduction cooking system including a plurality of electrodes and a power supply connected to the electrodes, wherein the electrodes are configured to connect the electrical conduction cooking system to the food to input electrical energy into the food by passing electric current through the food, wherein the electrical energy converts to thermal energy in the food to heat the food;
   a searing system for heating an external surface of the food, wherein the searing system comprises a hot oil cooking system configured to distribute hot oil on at least a portion of the external surface of the food;
   a temperature sensor positioned to receive temperature information about the food; and
   one or more controllers programmed with instructions that, when executed, receive the temperature information and perform closed-loop feedback control of the electrical conduction cooking system and/or the searing system to regulate a temperature of the food;
   wherein the hot oil cooking system comprises an oil reservoir, an air pump, a heater connected to the air pump, and one or more air passageways connected to the heater and the air pump, the one or more air passageways positioned to pass air into the oil reservoir to distribute the hot oil on the portion of the external surface of the food.

2. The system of claim 1, wherein:
   the temperature sensor is positioned to receive temperature information about the external surface of the food; and
   the temperature of the food is a temperature of the external surface of the food.

3. The system of claim 1, wherein the power supply is configured to provide variable regulated constant-current or constant-power output to the electrodes.

4. The system of claim 1, wherein:
   at least one of the one or more controllers is programmed with instructions that, when executed, receive electrical characteristic information about an electrical characteristic of the food from the power supply and perform closed-loop feedback control of the electrical conduction cooking system to modulate the electrical energy in response to the electrical characteristic information; and
   the power supply is configured to sense the electrical characteristic information, and the electrical characteristic information includes at least one of electrical impedance, electrical resistance, electrical reactance, electrical capacitance, dielectric constant, or dielectric loss.

5. The system of claim 1, further comprising:
   an enclosure; and
   an enclosure heating system for heating the enclosure;
   wherein the enclosure heating system comprises an induction heating coil or a resistance heating element.

6. The system of claim 1, wherein the temperature sensor is positioned or positionable to receive temperature information about an interior portion of the food.

7. A method for cooking food, the method comprising:
   inputting electrical energy into the food by passing electric current through the food, wherein the electrical energy converts to thermal energy in the food to heat the food;
   sensing a characteristic of the food, wherein the characteristic includes an internal temperature of the food and/or an electrical characteristic of the food;
   modulating the electric current in response to the characteristic of the food to achieve a selected internal temperature of the food; and
   heating at least a portion of a surface of the food with hot oil, wherein heating the portion of the surface of the food with hot oil comprises distributing the hot oil within a cooking zone, and wherein heating the portion of the surface of the food with hot oil comprises:
(a) heating the portion of the surface with hot oil while passing electric current through the food; and/or
(b) heating the portion of the surface with hot oil after passing electric current through the food and the method is performed within a single appliance.

8. The method of claim 7, wherein:
the selected internal temperature is an intermediate internal temperature;
the method further comprises determining, using a controller, the intermediate internal temperature based on a heat capacity of the food and a target internal temperature that is higher than the intermediate internal temperature; and
heating the portion of the surface of the food comprises heating the portion of the surface of the food until the internal temperature reaches the target internal temperature.

9. The method of claim 7, further comprising modulating a temperature of the hot oil using closed-loop feedback control with input from a temperature sensor in contact with the hot oil.

10. The method of claim 7, wherein distributing the hot oil within the cooking zone comprises passing air into an oil reservoir to splash or spray the hot oil within the cooking zone.

11. The method of claim 10, further comprising heating the air before passing the air into the oil reservoir.

12. The method of claim 7, further comprising heating an enclosure configured to contain the food, wherein heating the enclosure comprises operating an induction heating coil or a resistance heating element connected to the enclosure.

13. A system for cooking food, the system comprising:
an electrical conduction cooking system, the electrical conduction cooking system including a plurality of electrodes and a power supply connected to the electrodes, wherein the electrodes are configured to connect the electrical conduction cooking system to the food to input electrical energy into the food by passing electric current through the food, wherein the electrical energy converts to thermal energy in the food to heat the food; and
a searing system for heating at least a portion of an external surface of the food,
wherein the searing system comprises a hot oil cooking system configured to distribute hot oil on the external surface of the food, wherein the hot oil cooking system comprises:
an oil reservoir;
an air pump;
a heater connected to the air pump; and
one or more air passageways connected to the heater and the air pump, the one or more air passageways positioned to pass air into the oil reservoir to distribute the hot oil on the external surface of the food.

14. The system of claim 13, further comprising:
a temperature sensor positioned to receive temperature information about the food; and
one or more controllers programmed with instructions that, when executed:
receive the temperature information and perform closed-loop feedback control of the electrical conduction cooking system and/or the searing system to regulate a temperature of the food.

15. The system of claim 13, wherein:
the system further comprises one or more controllers programmed with instructions that, when executed, receive electrical characteristic information about an electrical characteristic of the food from the power supply and perform closed-loop feedback control of the electrical conduction cooking system to modulate the electrical energy in response to the electrical characteristic information; and
the power supply is configured to sense the electrical characteristic information, and the electrical characteristic information includes at least one of electrical impedance, electrical resistance, electrical reactance, electrical capacitance, dielectric constant, or dielectric loss.

16. The system of claim 13, further comprising:
an enclosure; and
an enclosure heating system for heating the enclosure;
wherein the enclosure heating system comprises an induction heating coil or a resistance heating element.

17. A system for cooking food, the system comprising:
an enclosure;
an enclosure heating system for heating the enclosure, wherein the enclosure heating system comprises an induction heating coil or a resistance heating element;
an electrical conduction cooking system, the electrical conduction cooking system including a plurality of electrodes and a power supply connected to the electrodes, wherein the electrodes are configured to connect the electrical conduction cooking system to the food to input electrical energy into the food by passing electric current through the food, wherein the electrical energy converts to thermal energy in the food to heat the food;
a searing system for heating an external surface of the food, wherein the searing system comprises a hot oil cooking system configured to distribute hot oil on at least a portion of the external surface of the food, wherein the hot oil cooking system comprises an air pump, a heater, and one or more air passageways connecting the air pump to the enclosure;
a temperature sensor positioned to receive temperature information about the food; and
one or more controllers programmed with instructions that, when executed:
receive the temperature information and perform closed-loop feedback control of the electrical conduction cooking system and/or the searing system to regulate a temperature of the food.

18. A system for cooking food, the system comprising:
an electrical conduction cooking system, the electrical conduction cooking system including a plurality of electrodes and a power supply connected to the electrodes, wherein the electrodes are configured to connect the electrical conduction cooking system to the food to input electrical energy into the food by passing electric current through the food, wherein the electrical energy converts to thermal energy in the food to heat the food;
an enclosure;
a searing system for heating at least a portion of an external surface of the food, wherein the searing system comprises a hot oil cooking system configured to distribute hot oil on the external surface of the food, wherein the hot oil cooking system comprises an air pump, a heater, and one or more air passageways connecting the air pump to the enclosure;

and
an enclosure heating system for heating the enclosure;
wherein the enclosure heating system comprises an induction heating coil or a resistance heating element.

* * * * *